(12) United States Patent
Anderson et al.

(10) Patent No.: US 10,145,621 B2
(45) Date of Patent: Dec. 4, 2018

(54) MULTI-ZONE CIRCUITING FOR A PLATE-FIN AND CONTINUOUS TUBE HEAT EXCHANGER

(71) Applicant: Hussmann Corporation, Bridgeton, MO (US)

(72) Inventors: Timothy D. Anderson, St. Louis, MO (US); Ken Nguyen, St. Louis, MO (US); Paul R. Laurentius, Maryland Heights, MO (US)

(73) Assignee: Hussmann Corporation, Bridgeton, MO (US)

( * ) Notice: Subject to any disclaimer, the term of this patent is extended or adjusted under 35 U.S.C. 154(b) by 816 days.

(21) Appl. No.: 13/768,238

(22) Filed: Feb. 15, 2013

(65) Prior Publication Data
US 2013/0213626 A1    Aug. 22, 2013

Related U.S. Application Data

(60) Provisional application No. 61/600,326, filed on Feb. 17, 2012.

(51) Int. Cl.
*F28D 1/04* (2006.01)
*F28D 1/047* (2006.01)
(Continued)

(52) U.S. Cl.
CPC ............... *F28F 1/00* (2013.01); *B23P 15/26* (2013.01); *F25B 39/02* (2013.01); *F28D 1/0417* (2013.01);
(Continued)

(58) Field of Classification Search
CPC .... F28D 1/0417; F28D 1/0426; F28D 1/0435; F28D 1/0477; F28F 9/26; F28F 9/262;
(Continued)

(56) References Cited

U.S. PATENT DOCUMENTS 2,669,099 A * 2/1954 Malkoff .................. F25B 39/02
                                                    165/144
3,757,746 A   9/1973 Sharan
(Continued)

FOREIGN PATENT DOCUMENTS

DE          3510406       9/1986
DE      102008049896      4/2010
(Continued)

OTHER PUBLICATIONS

Extended European Search Report for Application No. 13155660.7 dated Jun. 30, 2015 (8 pages).

(Continued)

*Primary Examiner* — Len Tran
*Assistant Examiner* — Hans Weiland
(74) *Attorney, Agent, or Firm* — Michael Best & Friedrich LLP

(57) ABSTRACT

A multi-zone heat exchanger has a first end and a second end and a width divided into a plurality of parallel airflow zones. Each zone defines an airflow section of the heat exchanger that receives a portion of the airflow through the heat exchanger. A first tube of continuous construction is coupled to an inlet port and to an outlet port and forms a first refrigerant circuit spanning three or more passes from the first end to the second end. The first refrigerant circuit passes between at least two zones of the plurality of zones. A second tube of continuous construction is coupled to the inlet port and to the outlet port and forms a second refrigerant circuit spanning three or more passes from the first end to the second end. The second refrigerant circuit passes between the at least two zones of the plurality of zones.

19 Claims, 20 Drawing Sheets

(51) Int. Cl.
  *B23P 15/26* (2006.01)
  *F28F 1/00* (2006.01)
  *F25B 39/02* (2006.01)

(52) U.S. Cl.
  CPC ....... *F28D 1/0477* (2013.01); *Y10T 29/49377* (2015.01)

(58) Field of Classification Search
  CPC ..... F28F 2210/04; F25B 39/02; F25B 39/028; B23P 15/26; Y10T 29/49377
  USPC .......................................... 62/524, 525, 526
  See application file for complete search history.

(56) References Cited

U.S. PATENT DOCUMENTS

| | | | |
|---|---|---|---|
| 3,780,799 A | | 12/1973 | Pasternak |
| 4,446,915 A | * | 5/1984 | Welch ................... F28D 1/0477 165/144 |
| 4,580,623 A | | 4/1986 | Smitte et al. |
| 4,995,454 A | | 2/1991 | Thompson |
| 5,183,105 A | | 2/1993 | Adams |
| 5,251,693 A | | 10/1993 | Zifferer |
| 5,390,731 A | | 2/1995 | Selm et al. |
| 5,540,276 A | | 7/1996 | Adams et al. |
| 5,613,554 A | | 3/1997 | Bull et al. |
| 5,687,678 A | | 11/1997 | Suchomel et al. |
| 5,875,837 A | | 3/1999 | Hughes |
| 6,053,238 A | * | 4/2000 | Goth ..................... F28D 1/0477 165/10 |
| 6,116,048 A | * | 9/2000 | Hebert ................... F24F 1/0059 62/524 |
| 6,272,876 B1 | * | 8/2001 | Roberts ................. A47F 3/0482 454/193 |
| 6,598,295 B1 | | 7/2003 | Utter |
| 7,032,411 B2 | * | 4/2006 | Hebert ..................... F25B 39/02 62/510 |
| 2004/0118151 A1 | | 6/2004 | Hebert |
| 2008/0115920 A1 | | 5/2008 | Uchida et al. |
| 2008/0271473 A1 | * | 11/2008 | Fung ..................... A47F 3/0443 62/428 |
| 2010/0326643 A1 | * | 12/2010 | Hancock ............... F28D 1/0477 165/181 |

FOREIGN PATENT DOCUMENTS

| | | | |
|---|---|---|---|
| GB | 501202 | 2/1939 | |
| GB | 501202 A * | 2/1939 | ............... F22D 1/06 |
| JP | 494204 | 1/1974 | |
| JP | S6060571 | 4/1985 | |
| JP | H11333539 | 12/1999 | |
| JP | 2002361346 | 12/2002 | |
| WO | 03099487 | 12/2003 | |
| WO | 2007/062916 | 6/2007 | |

OTHER PUBLICATIONS

Examination Report from the European Patent Office for Application No. 13 155 660.7-1605 dated Aug. 18, 2016 (7 pages).

\* cited by examiner

MULTI-ZONE CIRCUITING FOR A PLATE-FIN AND CONTINUOUS TUBE HEAT EXCHANGER

BACKGROUND

The present invention relates to a heat exchanger, and more particularly, to a plate-fin continuous tube heat exchanger.

Plate-fin tube heat exchangers typically include brazed hairpin and return bend. copper tubes, the joints of which can leak refrigerant and require manufacturing time and effort. In addition, existing plate-fin and continuous tube heat exchangers are typically limited to a single circuit within a particular air distribution zone because the circuit tubes do not cross between zones.

A non-uniform airflow distribution through these heat exchangers, often driven by geometric constraints, can result in superheat levels that vary dramatically for each circuit. A circuit with a higher airflow rate passing over its tubes will have higher overall heat transfer to the refrigerant, which results in a higher level of superheat within that circuit as compared to circuits exposed to lower airflow rates. Because superheated refrigerant transfers heat less efficiently than saturated vapor refrigerant or a liquid and vapor refrigerant mixture, single-zone circuiting in existing continuous tube heat exchangers can result in an unbalanced superheat condition within one or more tube circuits and thermal inefficiencies in the heat exchanger.

SUMMARY

The present invention provides multi-zone circuiting of a continuous tube heat exchanger, which balances superheat levels and maximizes heat transfer by shifting one or more refrigerant circuits between the air distribution zones. The heat exchanger includes a nested tube arrangement that provides flexibility in achieving complex, multi-zone circuiting for use with continuous tubes and plate-fins with conventional tube slots while minimizing refrigerant leaks.

In one embodiment a multi-zone heat exchanger has a first end and a second end and a width divided into a plurality of parallel airflow zones. Each zone defines an airflow section of the heat exchanger that receives a portion of the airflow through the heat exchanger. The heat exchanger includes a refrigerant inlet port and a refrigerant outlet port. A first tube of continuous construction is coupled to the inlet port and to the outlet port and forms a first refrigerant circuit spanning three or more passes from the first end to the second end. The first refrigerant circuit passes between at least two zones of the plurality of zones. A second tube of continuous construction is coupled to the inlet port and to the outlet port and forms a second refrigerant circuit spanning three or more passes from the first end to the second end. The second refrigerant circuit passes between the at least two zones of the plurality of zones.

In one embodiment of a method of assembling a multi-zone heat exchanger having a width divided into a plurality of parallel airflow zones, in which each zone defines an airflow section of the heat exchanger configured to receive a portion of the airflow and a length from a first end to a second end defining a pass, the method includes positioning in a first direction a first tube of continuous construction spanning four or more passes and having a first bend portion joining two of the passes at the first end and crossing from the first zone to the second zone and a second bend portion joining two of the passes at the first end and crossing from the first zone to the third zone, into a nested relationship with a second tube spanning four or more passes and having a first bend portion joining two of the second tube passes at the first end and crossing from the first zone to the second zone and a second bend portion joining two of the second tube passes at the first end and crossing from the first zone to the third zone. The nested relationship forms a tube network. The method also includes moving the tube network in a second direction opposite the first direction through a plurality of parallel fins into a heat exchange relationship with the fins.

In one embodiment a multi-zone heat exchanger has a first end and a second end and a width divided into a plurality of parallel airflow zones. Each zone defines an airflow section of the heat exchanger that receives a portion of the airflow through the heat exchanger. The heat exchanger includes a refrigerant inlet port and a refrigerant outlet port. A plurality of fins are spaced between the first end and the second end. A first tube of continuous construction is coupled to the inlet port and to the outlet port and forms a first refrigerant circuit spanning three or more passes extending through the plurality of fins. Each pass is disposed in a single zone. The first refrigerant circuit passes between three zones of the plurality of zones. A second tube of continuous construction is coupled to the inlet port and to the outlet port and forms a second refrigerant circuit spanning three or more passes extending through the plurality of fins. Each pass is disposed in a single zone. The second refrigerant circuit passes between the three zones of the plurality of zones.

Other aspects of the invention will become apparent by consideration of the detailed description and accompanying drawings.

BRIEF DESCRIPTION OF THE DRAWINGS

FIG. 4 is an end view of the heat exchanger of FIG. 2a.

FIG. 6b is another perspective view of the heat exchanger of FIG. 6a.

FIG. 7a is a perspective view of one continuous tube circuit of the heat exchanger of FIG. 6a.

FIG. 7b is a perspective view of two continuous tube circuits of the heat exchanger of FIG. 6a.

FIG. 7c is a perspective view of three continuous tube circuits of the heat exchanger of FIG. 6a.

FIG. 7*d* is a perspective view of the tube circuits of FIG. 7*c* in a nested relationship.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
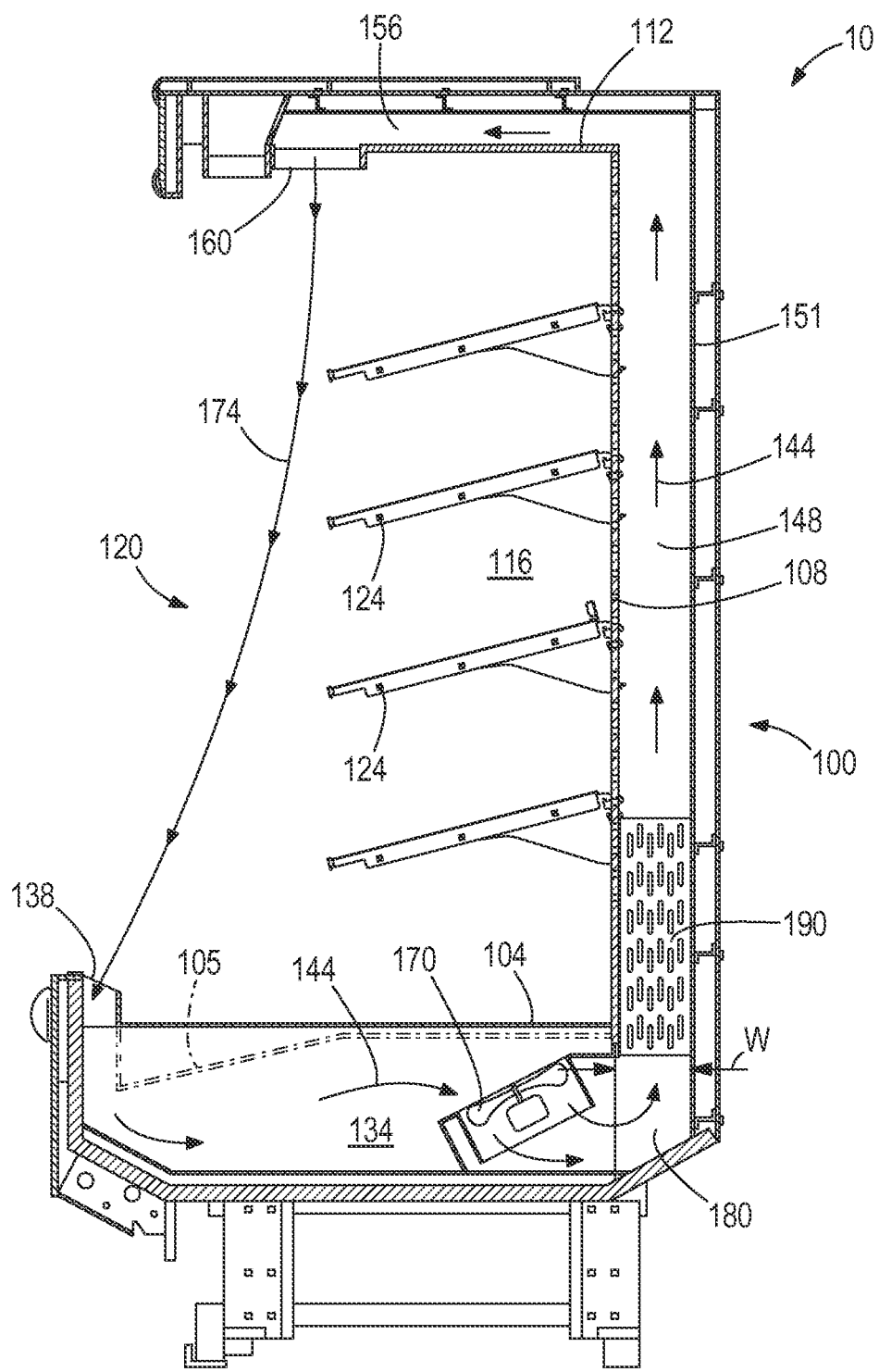
FIG. 1 is a section view of a refrigerated merchandiser having a multi-zone circuit heat exchanger embodying the invention.

FIG. 1 shows a refrigerated merchandiser 10 including a case 100 that has a base 104, a rear wall 108, and a canopy or case top 112. The area that is partially enclosed by the base 104, the rear wall 108, and the canopy 112 defines a product display area 116. As illustrated, the product display area 116 is accessible by customers through an opening 120 adjacent the front of the case 100. Shelves 124 are coupled to the rear wall 108 and extend forward toward the opening 120 adjacent the front of the merchandiser to support food product that is accessible by a consumer through the opening 120.

The base 104 defines a lower portion of the product display area 116 and can support food product. The base 104 further defines a lower flue 134 and includes an inlet 138 located adjacent a lower area of the opening 120. The base 104 can be a rigid pan of for example, sheet metal construction. Alternatively, the base 104 can be a wire rack, in which case a separate drip pan 105 serves to define the lower flue 134. As illustrated, the lower flue 134 is in fluid communication with the inlet 138 and directs an airflow 144 substantially horizontally through the base 104 from the inlet 138. The inlet 138 is positioned to receive surrounding air in a substantially vertical direction and directs the air into the lower flue 134.

With continued reference to FIG. 1, the case 100 includes a rear flue 148 extending upward from the base 104 and in fluid communication with the lower flue 134. The rear flue 148 and the lower flue 134 cooperatively define a corner 180 in the air passageway. The rear flue 148 is defined by the rear wall 108 and an intermediate wall 151 spaces apart from the rear wall 108, and directs the airflow 144 generally vertically through the case 100. In some constructions, the rear wall 108 can include apertures (not shown) that fluidly couple the rear flue 148 with the product display area 116 to permit at least some of the airflow 144 to enter the product display area 116.

The canopy 112 defines an upper flue 156. The upper flue 156 is in fluid communication with the rear flue 148 and directs the airflow 144 substantially horizontally through the canopy 112 toward an outlet 160. The lower flue 134, the rear flue 148, and the upper flue 156 are fluidly coupled to each other to define an air passageway that directs the airflow 144 from the inlet 138 to the outlet 160.

The airflow that is discharged from the outlet 160 forms an air curtain 174 that is directed generally downward across the opening 120 to cool the food product within a desired or standard temperature range (e.g., 32 to 41 degrees Fahrenheit). Generally, the inlet 138 receives at least some air from the air curtain 174. Although not shown, the case 100 can define a secondary air passageway that directs a secondary air curtain (e.g., refrigerated or non-refrigerated) from the canopy 112 generally downward across the opening 120 to buffer the air curtain 174 to minimize infiltration of ambient air into the product display area 116.

As illustrated in FIG. 1, the merchandiser also includes a heat exchanger 190 that is positioned in a lower portion of the rear flue 148. As will be understood and appreciated by one of ordinary skill in the art, the heat exchanger 190 transfers heat from the airflow 144 to refrigerant flowing through the heat exchanger. As oriented, the airflow 144 passes substantially vertically through the heat exchanger 190. Due to the positioning of the heat exchanger 190 proximate the corner 180, the vertical airflow 144 may not be identically uniform across the width W of the heat exchanger 190 (see FIG. 1).

Figure 2A:
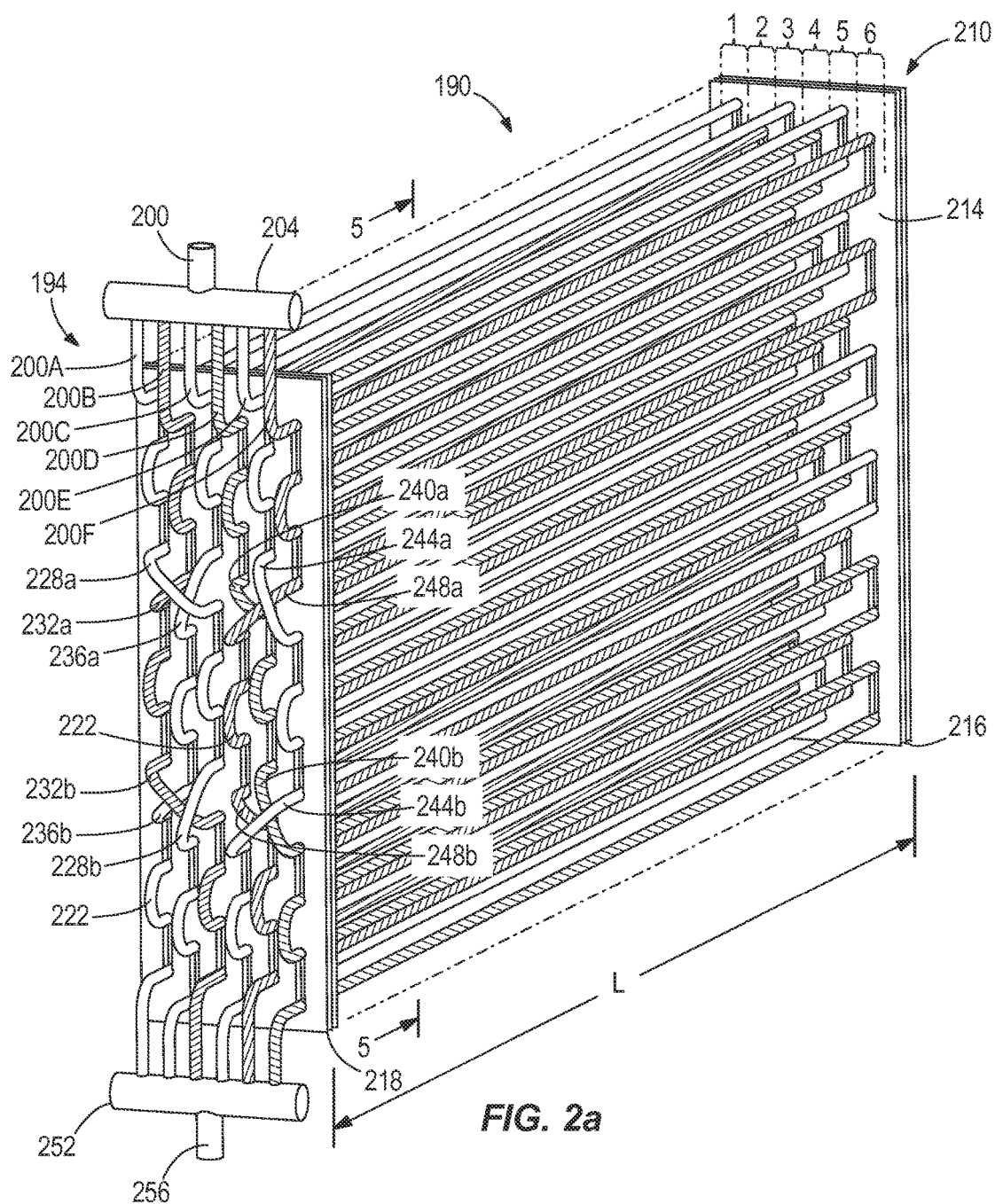
FIG. 2a is a perspective view of the heat exchanger of FIG. 1.
Figure 2B:
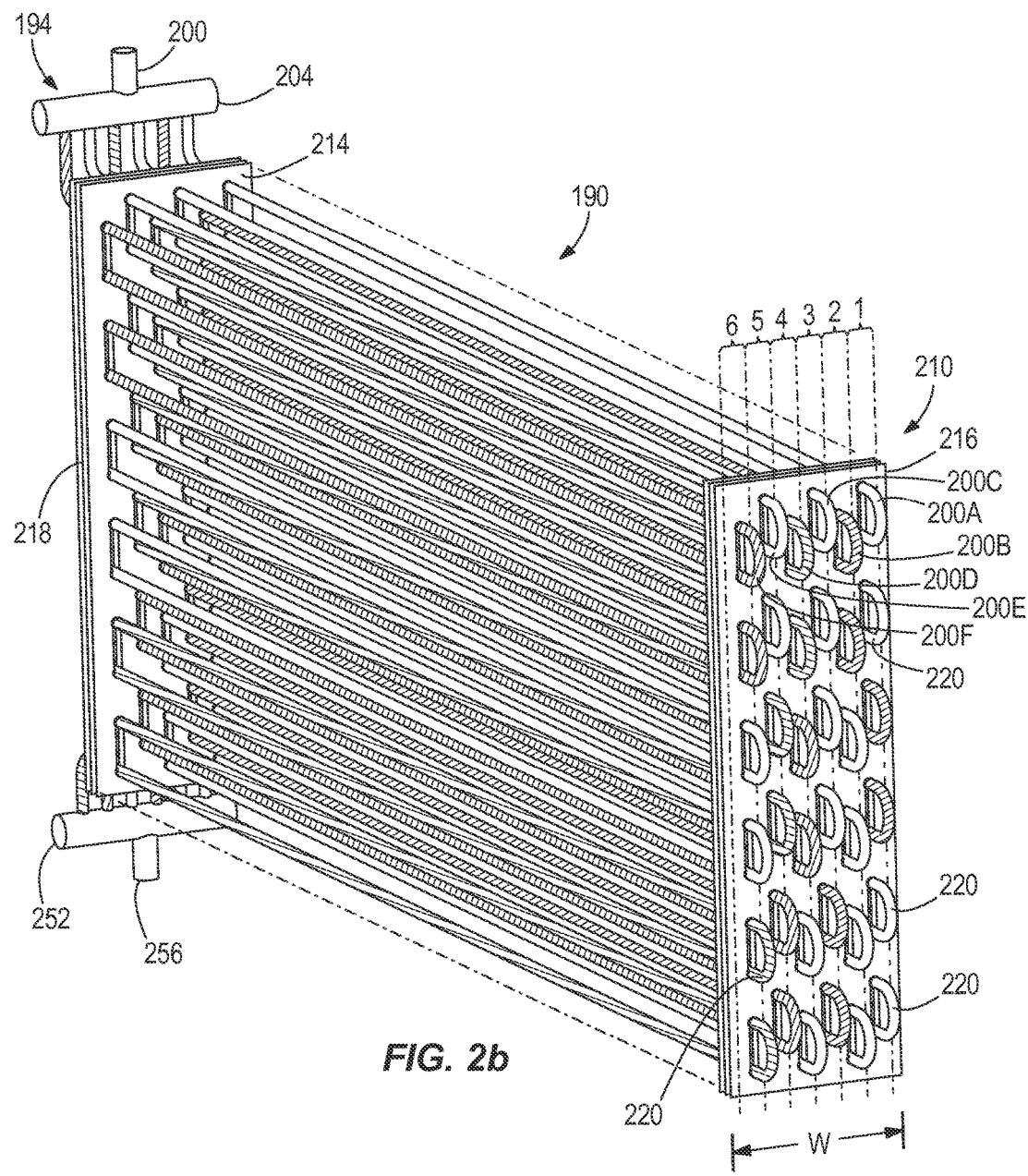
FIG. 2b is another perspective view of the heat exchanger of FIG. 1.

Referring to FIGS. 2*a* and 2*b*, the heat exchanger 190 is divided along its width W into six zones 1, 2, 3, 4, 5, 6. Each zone delineates an airflow section of the heat exchanger that receives a portion of the airflow 144 through the heat exchanger 190. At a first end 194 of the heat exchanger 190, an inlet port 200 directs refrigerant to an inlet manifold or distributor 204, which distributes the refrigerant to a series of six independent tube circuits 200A, 200B, 200C, 200D, 200E, 200F. As shown, the six tube circuits 200A-F extend from the first end 194 to a second end 210 of the heat exchanger 190 and pass through a plurality of generally equally spaced and substantially parallel fins 214 (additional interior fins, which may also vary in fin density—that is, fins per inch—are not shown for clarity).

At the second end 210, return bend portions 220 for each of the circuits 200A-F project from an end fin 216 to route refrigerant back through the heat exchanger 190. At the first end 194, return bend portions 222, 228, 232, 236, 240, 244, 248 for the six tube circuits 200A-F project from an end fin 218 that is on the opposite side of the heat exchanger 190 relative to the end fin 216 to route refrigerant back through the heat exchanger 190. An outlet manifold 252 at the first end 194 collects refrigerant that has flowed the length of the tube circuits 200A-F and directs it to an outlet port 256 for recirculation through the refrigerant system (not shown).

Figure 3A:
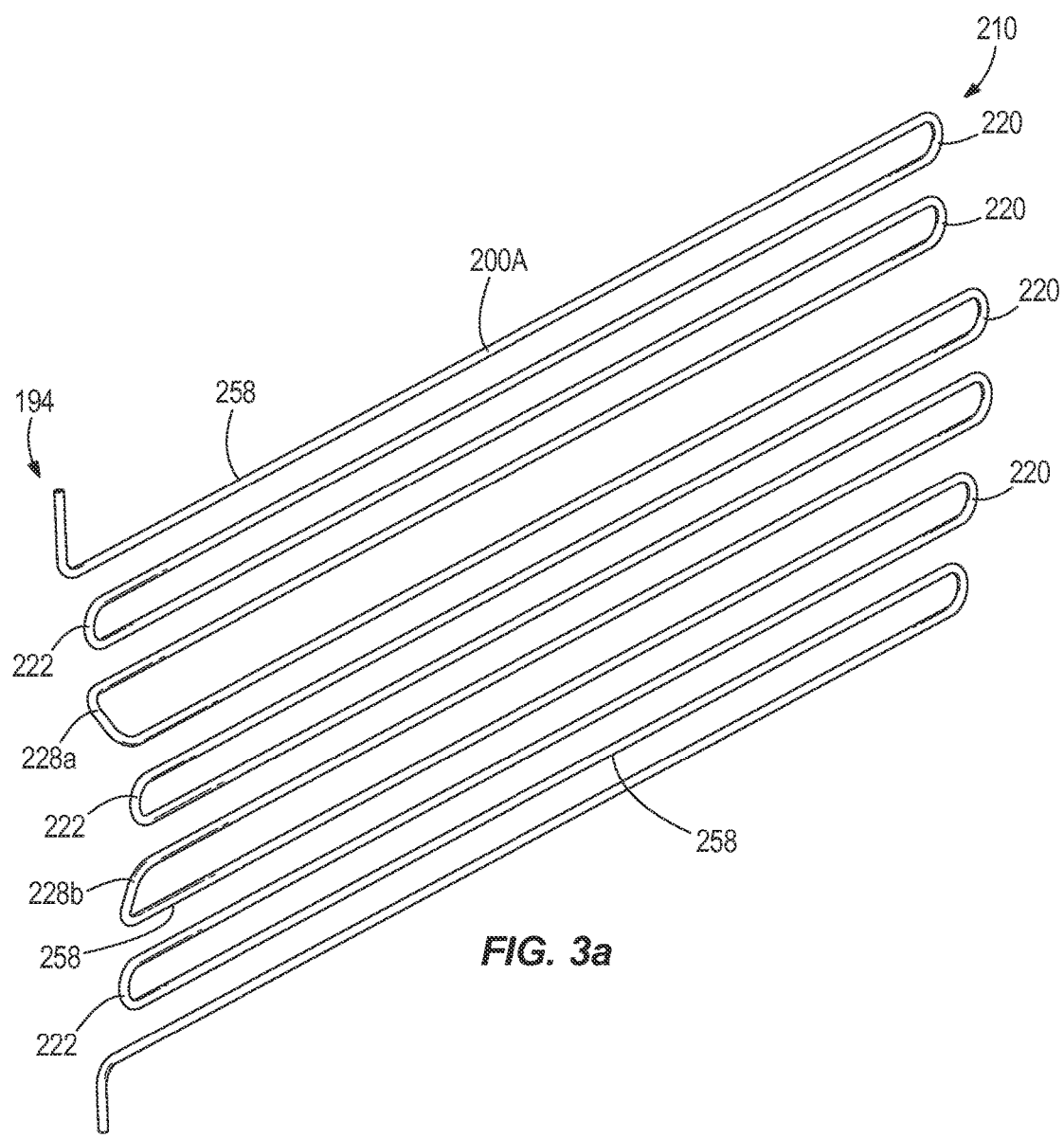
FIG. 3a is a perspective view of one continuous tube circuit of the heat exchanger of FIGS. 2a and 2b.

Generally, each tube circuit 200A-F is formed from a continuous tube that is bent into a serpentine shape. The tubes can be formed from any suitable material (e.g., metal such as an aluminum alloy or copper). While the tubes are illustrated with a substantially circular cross-section, other tube shapes (e.g., oval, polygonal, and the like) are also possible and considered herein. FIG. 3*a* shows the tube circuit 200A. As illustrated, the serpentine shape of the tube circuit 200A has twelve total tube passes 258 extending between the end fins 216, 218 such that the length L of the heat exchanger 190 (FIG. 2*a*) coincides with the length of a pass. In other constructions, each tube circuit 200A-F can have more or fewer than twelve total passes.

On the second end 210, each return bend portion 220 is located within one of zones 1-6 and seamlessly joins two tube passes 258 that extend through the length of the heat exchanger 190 within the corresponding zone 1-6. The return bend portions 222 located adjacent the first end 194 also join two tube passes 258 that extend through the length of the heat exchanger 190. Two of the return bend portions 228 at the first end of tube circuit 200A are crossover bend portions 228a, 228b that "cross over" from one zone to another to connect a tube pass that is in one zone to a tube pass 258 that is in another zone. The amount of time the refrigerant in the tube spends in each zone (refrigerant passage time) directly correlates with the amount of balancing between the circuits. As illustrated in FIG. 3a, the first end 194 includes five total bends. The crossover bend portions 228a, 228b need not be located where illustrated and can be positioned higher or lower (toward or away from the manifolds 204, 252 as viewed in FIG. 2a) within the individual tube circuit, or otherwise configured to achieve a desired refrigerant passage time within each zone. Due to the crossover bend portions 228a, 228b, the return bend portions 220 for a given tube circuit are not all vertically aligned at the second end 210 (see e.g., FIG. 2b). With reference to FIGS. 2a, 2b, and 3a, no tube pass 258 crosses from one zone to another zone through the length of the heat exchanger 190 or at the second end 210. That is, the crossover of each tube circuit 200A-F between zones occurs entirety via the crossover bend portions 228a, 228b at the first end 194.

Figure 3B:
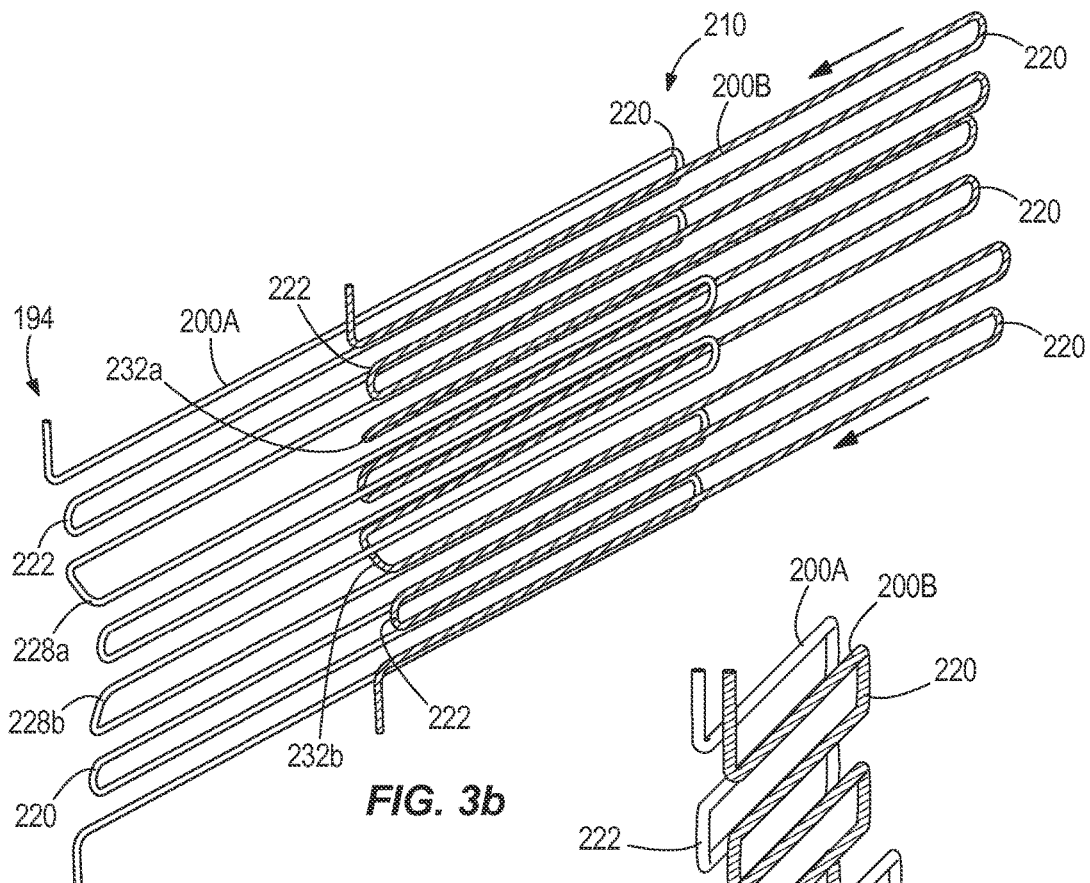
FIG. 3b is a perspective view of two continuous tube circuits of the heat exchanger of FIGS. 2a and 2b.
Figure 3C:
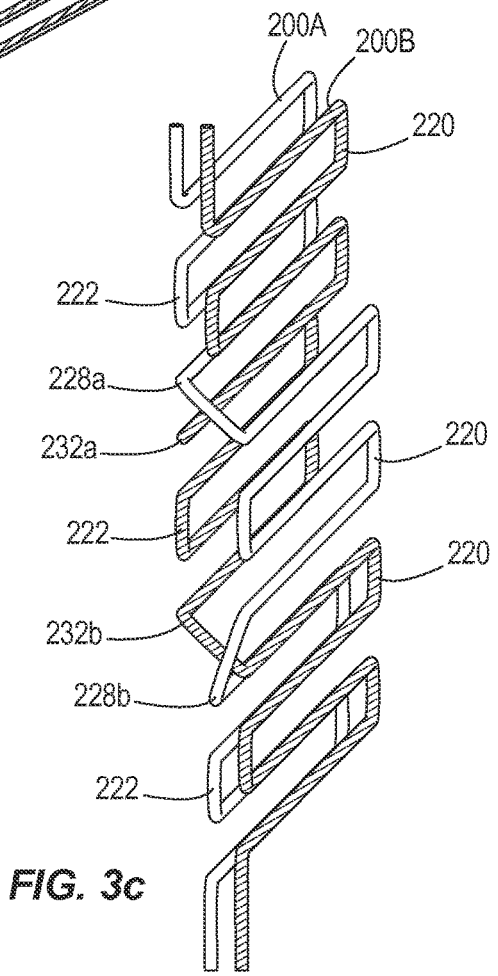
FIG. 3c is a perspective view of the tube circuits of FIG. 3b in a nested relationship.

Referring to FIG. 3b, the tube circuit 200B is illustrated in a spaced apart nested relationship with the tube circuit 200A. The tube circuit 200B includes return bend portions 220, 222 and also includes two lateral crossover bend portions 232a, 232b at the first end 194. When assembled, the tube circuit 200B is fully meshed or nested with the tube circuit 200A without interference. That is, movement of tube circuit 200B into a nested arrangement with the tube circuit 200A is not impeded by the tube circuit 200A. The tube circuits 200A, 200B cooperate to form the nested arrangement shown in FIG. 3c.

Figure 3D:
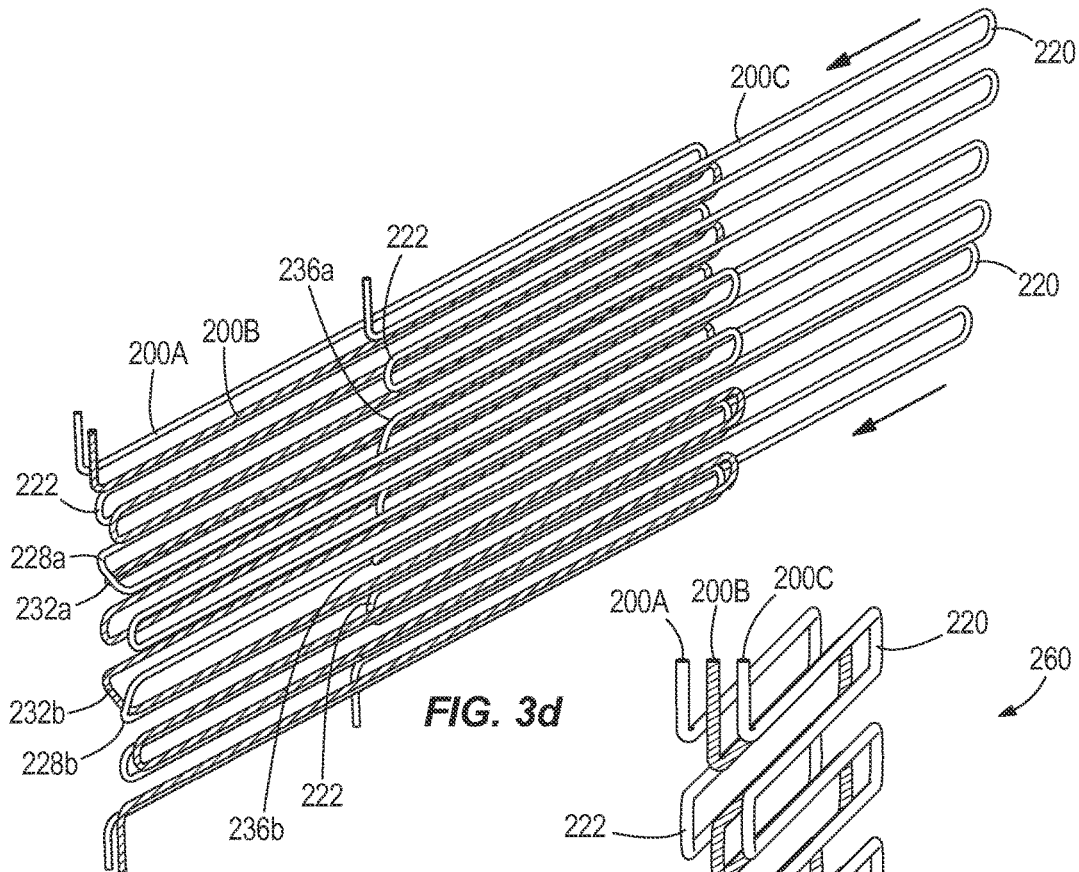
FIG. 3d is a perspective view of three continuous tube circuits of the heat exchanger of FIGS. 2a and 2b.
Figure 3E:
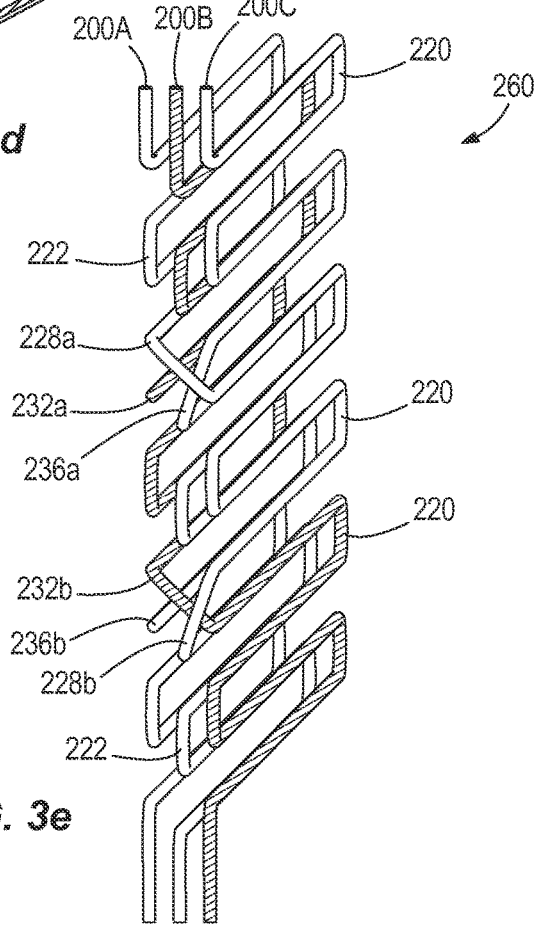
FIG. 3e is a perspective view of the tube circuits of FIG. 3d in a nested relationship.

Referring to FIG. 3d, the tube circuit 200C is illustrated as being partially engaged or nested with the nested tube circuits 200A and 200B. The tube circuit 200C includes the bend portions 220, 222 and two lateral crossover bend portions 236a, 236b. As illustrated, the tube circuit 200C is fully meshed or nested with the tube circuits 200A and 200B without interference among the circuits 200A-C. With reference to FIG. 3e, the tube circuits 200A, 200B, 200C cooperate to form a first interzone tube network 260.

Figure 3F:
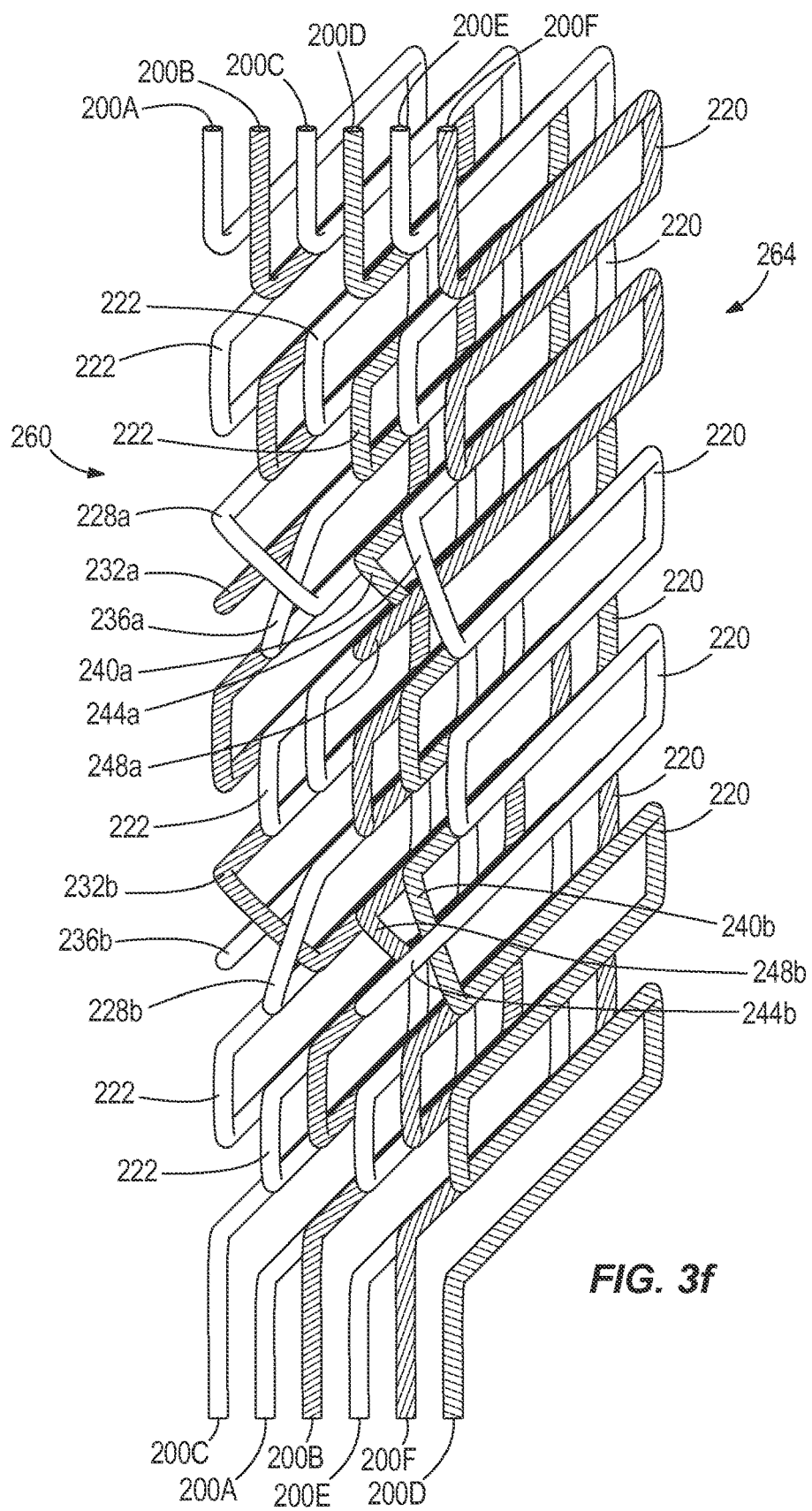
FIG. 3f is a perspective view of two sets of three continuous tube circuits in a nested relationship.

Referring to FIG. 3f, the tube circuits 200D, 200E, 200F are similarly positioned to form a second interzone tube network 264 adjacent the tube network 260. The tube circuit 200D includes bend portions 220, 222 and two crossover bend portions 240a, 240b. The tube circuit 200E includes bend portions 220, 222 and two crossover bend portions 244a, 244b. The tube circuit 200F includes bend portions 220, 222 and two crossover bend portions 248a, 248b. As illustrated, the tube circuit 200F meshes or nests with the tube circuit 200E and the tube circuit 200D meshes or nests with the meshed tube circuits 200E, 200F. It should be appreciated that the second interzone tube network 264 does not interfere with the first interzone tube network 260.

Figure 4:
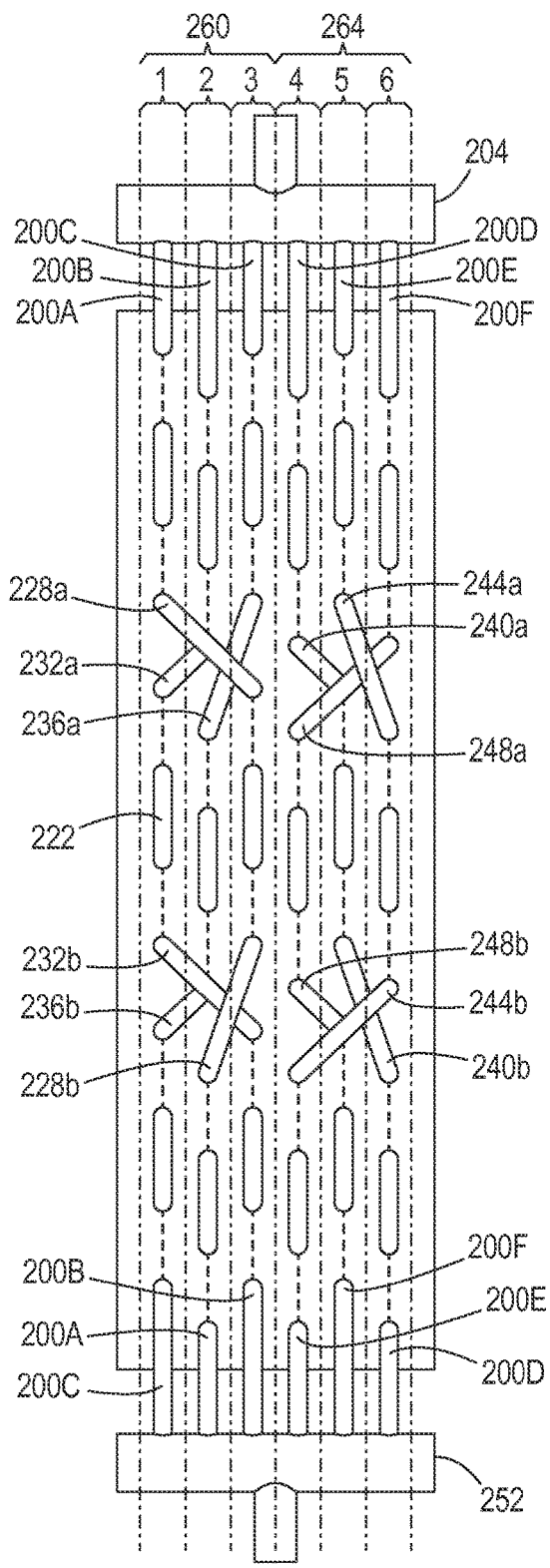

With reference to FIGS. 2a and 2b, the tube circuits 200A-C "switch" or crossover adjacent the first end 194 within zones 1-3 and the tube circuits 200D-F cross within zones 4-6 adjacent the first end 194. Referring to FIG. 4, the first tube network 260 directs refrigerant through tubes within zones 1-3. Each tube circuit 200A, 200B, 200C passes through each of the zones 1, 2, 3. For example, from the inlet manifold 204, refrigerant enters the tube circuit 200A within zone 1 and, by virtue of the crossover bend portion 228a, transitions to zone 3. From zone 3, the tube circuit 200A passes through crossover bend portion 228b to zone 2, from where it discharges refrigerant to the outlet manifold 252. The tube circuit 200B proceeds from the manifold 204 within zone 2, transitions through crossover bend portion 232a to zone 1, and passes through crossover bend portion 232b to zone 3 before reaching the outlet manifold 252. The tube circuit 200C originates within zone 3, transitions to zone 2 through the crossover bend portion 236a, and passes through zone 1 by virtue of the crossover bend portion 236b.

With continued reference to FIG. 4, the second tube network 264 directs refrigerant within zones 4-6. Each tube circuit 200D, 200E, 200F passes through each of the zones 4, 5, 6. Specifically, refrigerant enters tube 200D within zone 4, transitions to zone 5 through the crossover bend portion 240a, and passes to zone 6 through the crossover bend portion 240b before reaching the outlet manifold 256. The tube circuit 200E begins in zone 5, continues to zone 6 through the crossover bend portion 244a, and transitions back over to zone 4 through the crossover bend portion 244b. The tube circuit 200F starts within zone 6, transitions to zone 4 through the crossover bend portion 248a, and passes through the crossover bend portion 248b to zone 5 before reaching the outlet manifold 252.

As illustrated, the tube circuits 200A and 200B include one single crossover bend portion (i.e., the single crossover bend portion crosses only one zone) and one double crossover bend portion (i.e., the double crossover bend portions cross two zones). The tube circuit 200C includes two single crossover bends. Similarly, the tube circuits 200E and 200F include one single crossover bend and one double crossover bend, whereas the tube circuit 200D includes two single crossover bends. Other variations of single and double crossover bends for the tube circuits 200A-F are possible and considered herein.

Figure 5:
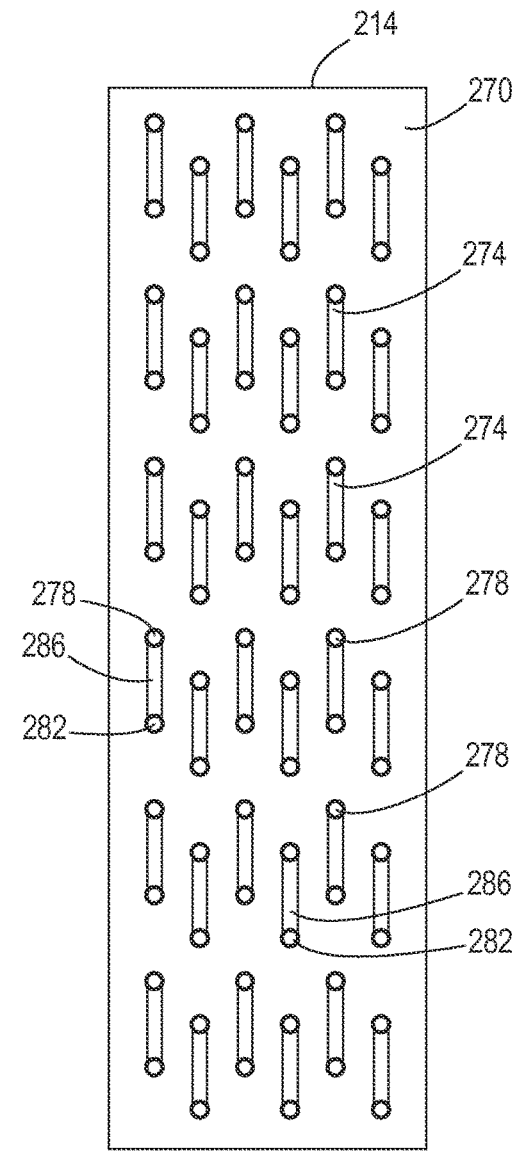
FIG. 5 is a section view of the heat exchanger of FIG. 2a taken along line 5-5.

FIG. 5 shows the orientation of the tube circuits 200A-F at a location in the heat exchanger 190 where the tube circuits 200A-F pass through an interior fin 214. The interior fin 214 is formed from a plate 270 that has a plurality of "dog bone" slots 274. Each dog bone slot 274 includes a first tube orifice 278 and a second tube orifice 282 that are connected by an elongated aperture 286. As shown, no tubes crossover within the interior of the heat exchanger 190, and the pattern of the dog bone slots 274 is aligned with the plurality of return bend portions 220 adjacent the end fin 216 (see FIG. 2b).

Although the heat exchanger 190 includes six zones 1-6 and six tube circuits 200A-F, heat exchangers with fewer or more than six zones and six tube circuits are possible and considered herein. Also, the horizontal and/or vertical spacing between the tubes of each tube circuit or between the tube circuits can be modified as desired. Other tube patterns also can be incorporated into the heat exchanger inline, staggered, angled, etc.).

Figure 6A:
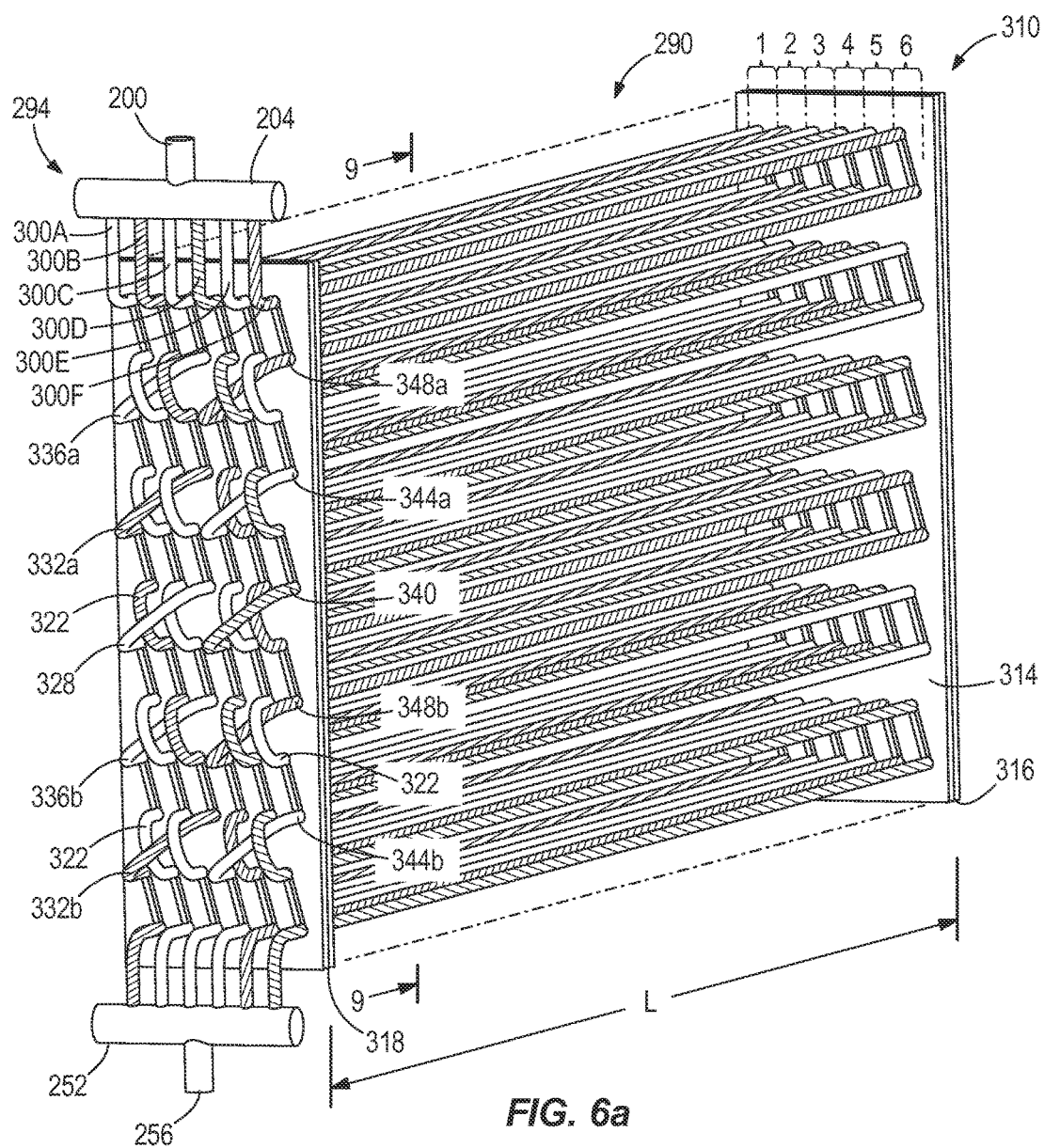
FIG. 6a is a perspective view of another multi-zone circuit heat exchanger for use with the merchandiser of FIG. 1.
Figure 6B:
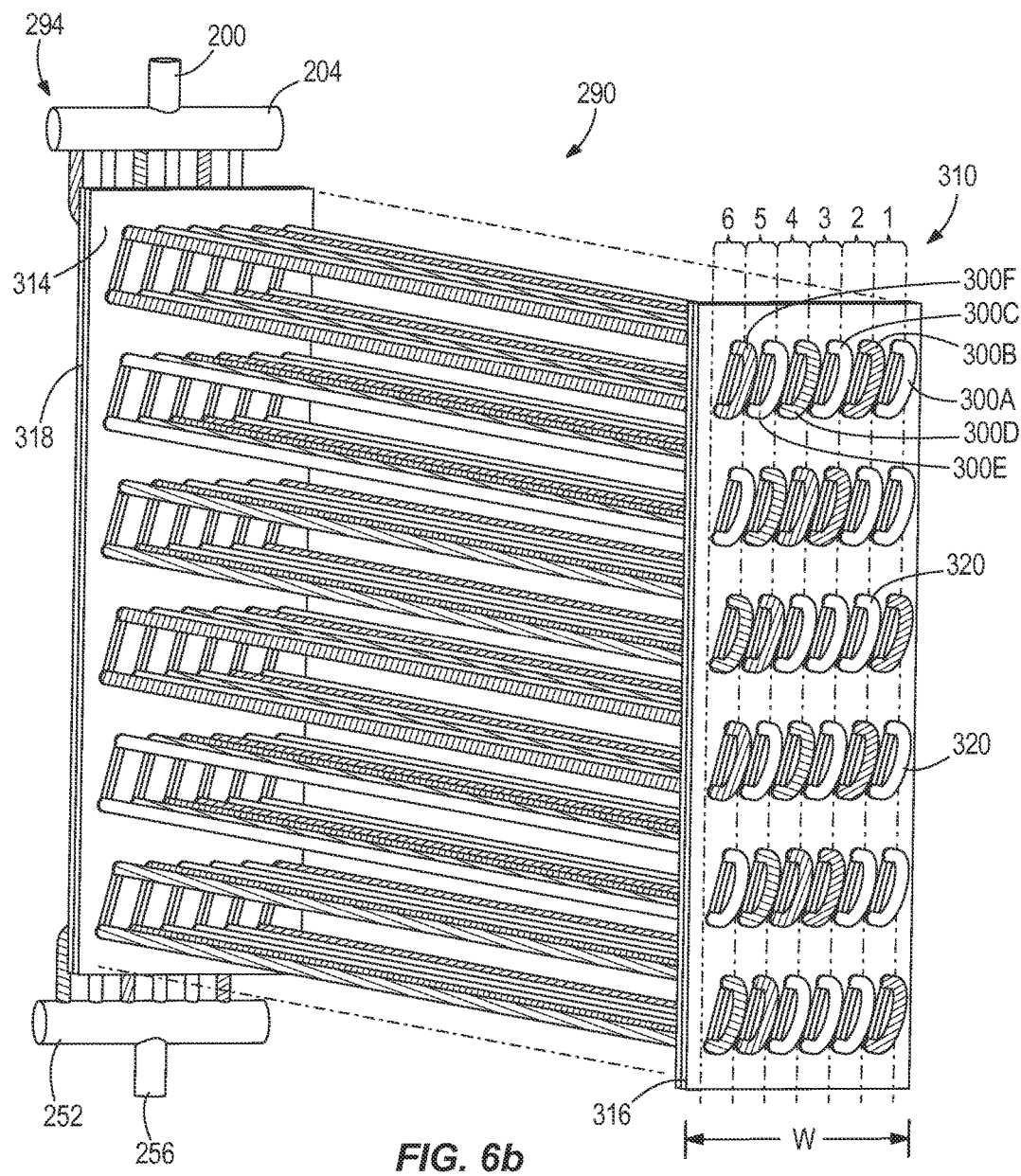

FIGS. 6a and 6b show another heat exchanger 290 that can be used with the merchandiser 10. The heat exchanger 290 includes a first end 294 and a second end 310, and the heat exchanger 290 is divided along the width W into six zones 1, 2, 3, 4, 5, 6. Six tube circuits 300A-F extend from the first end 294 to a second end 310 of the heat exchanger 290 and pass through a plurality of generally equally spaced and substantially parallel fins 314 (additional interior fins are not shown for clarity).

At the second end 310, return bend portions 320 for each of the circuits 300A-F project from an end fin 316 and route refrigerant back through the heat exchanger 290. With reference to FIG. 6b, the return bend portions 320 of the tube circuits 300A-F at the second end 310 are angled and oriented within one zone 1-6 (i.e., each return bend portion 320 is not staggered between zones). With reference to FIG. 6a, return bend portions 322, 328, 332, 336, 340, 344, 348 (corresponding to the six tube circuits) project from an end fin 318 to route refrigerant back through the heat exchanger 290.

Figure 7A:
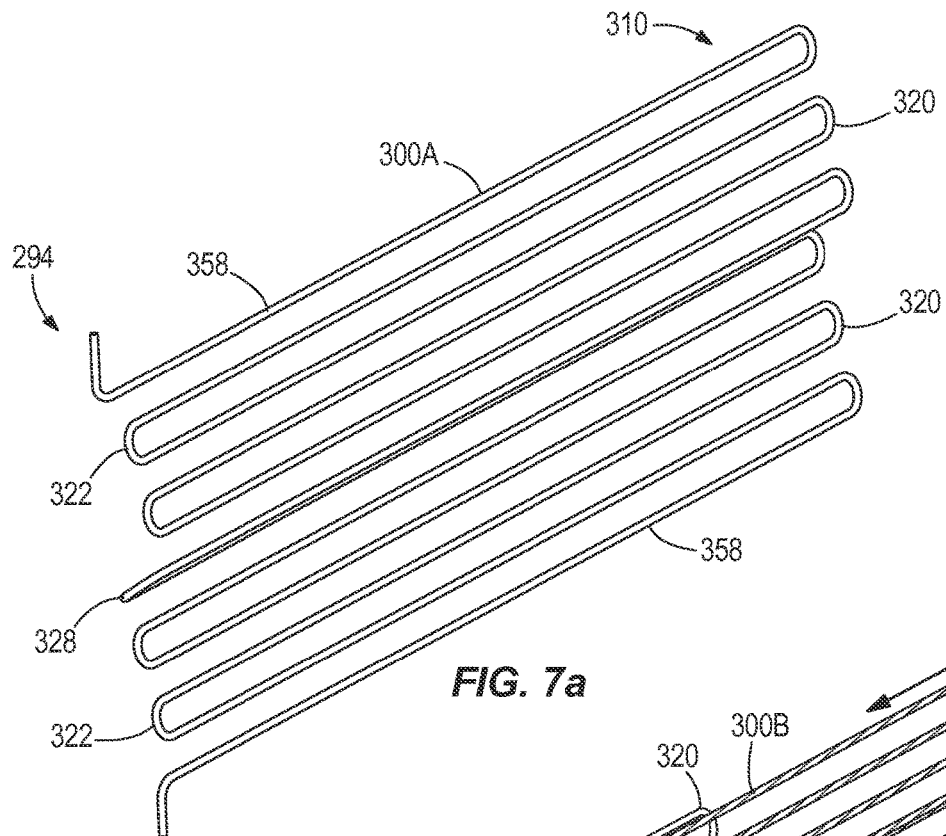

Referring to FIG. 7a, the tube circuit 300A is formed from a continuous tube that is bent into a serpentine shape and that has twelve passes 358 extending between the end fins 316, 318. On the second end 310, each return bend portion 320 joins two tube passes 358 that extend through the length of the heat exchanger 290 within a single zone 1, 2, 3, 4, 5, 6. The return bend portions 322 also join two tube passes 358 extending through the length of the heat exchanger 290. Each return bend portion 322 crosses over from one zone to another zone (e.g., from zone 1 to zone 2). The crossover bend portions 328 are double crossover bends that extend across or over two zones (e.g., from zone 1 to zone 3). As discussed with regard to FIGS. 1-5, the crossover for each circuit 300A-F is accomplished entirely by the return bend portions 322 and the double crossover bend portions 328 that are located adjacent the first end 294.

Figure 7B:
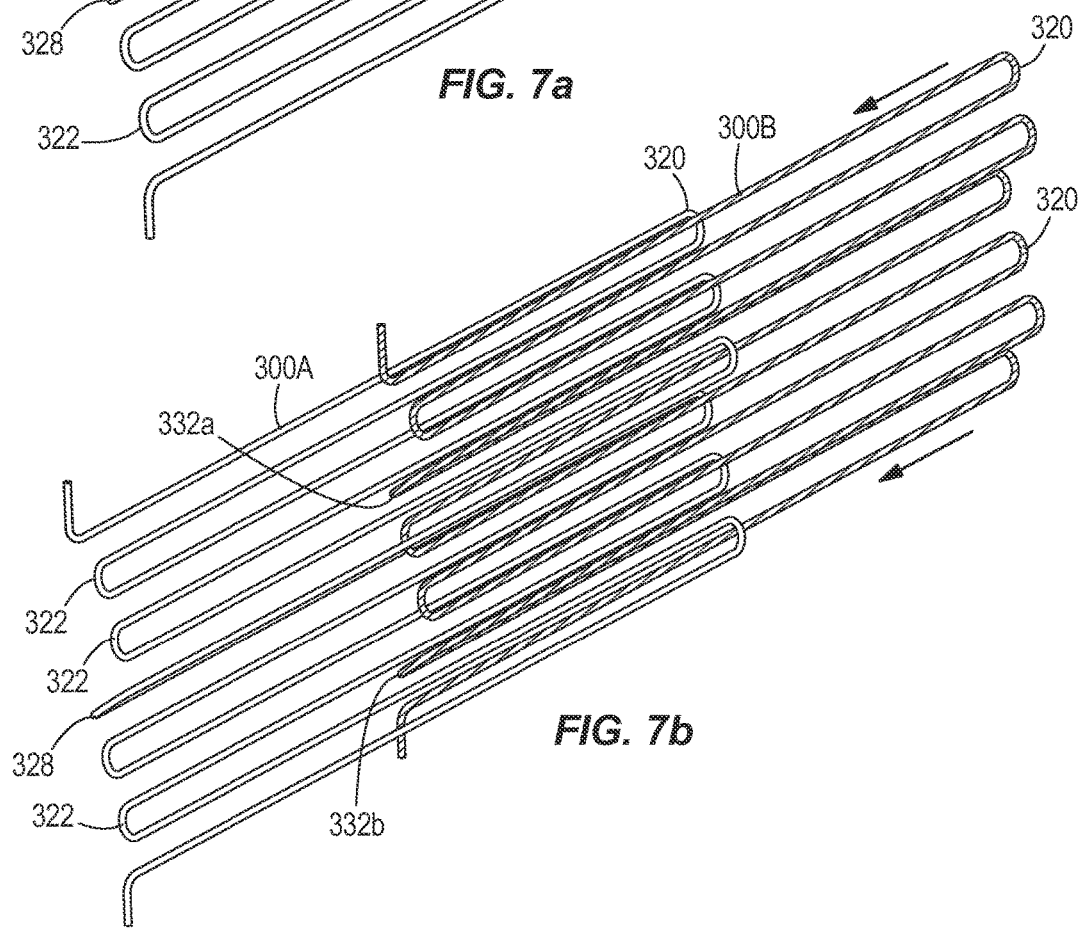

Referring to FIG. 7b, the tube circuit 300B is shown partially engaged or nested with the tube circuit 300A. The tube circuit 300B includes return bend portions 320, 322 and two double crossover bends 332a, 332b at the first end 294. The tube circuit 300B fully meshes with the tube circuit 300A without interference (i.e., movement of the tube circuit 300B into engagement with the tube circuit 300A is not impeded by the tube passes 358 of the tube circuit 300A).

Figures 7C, 7D:
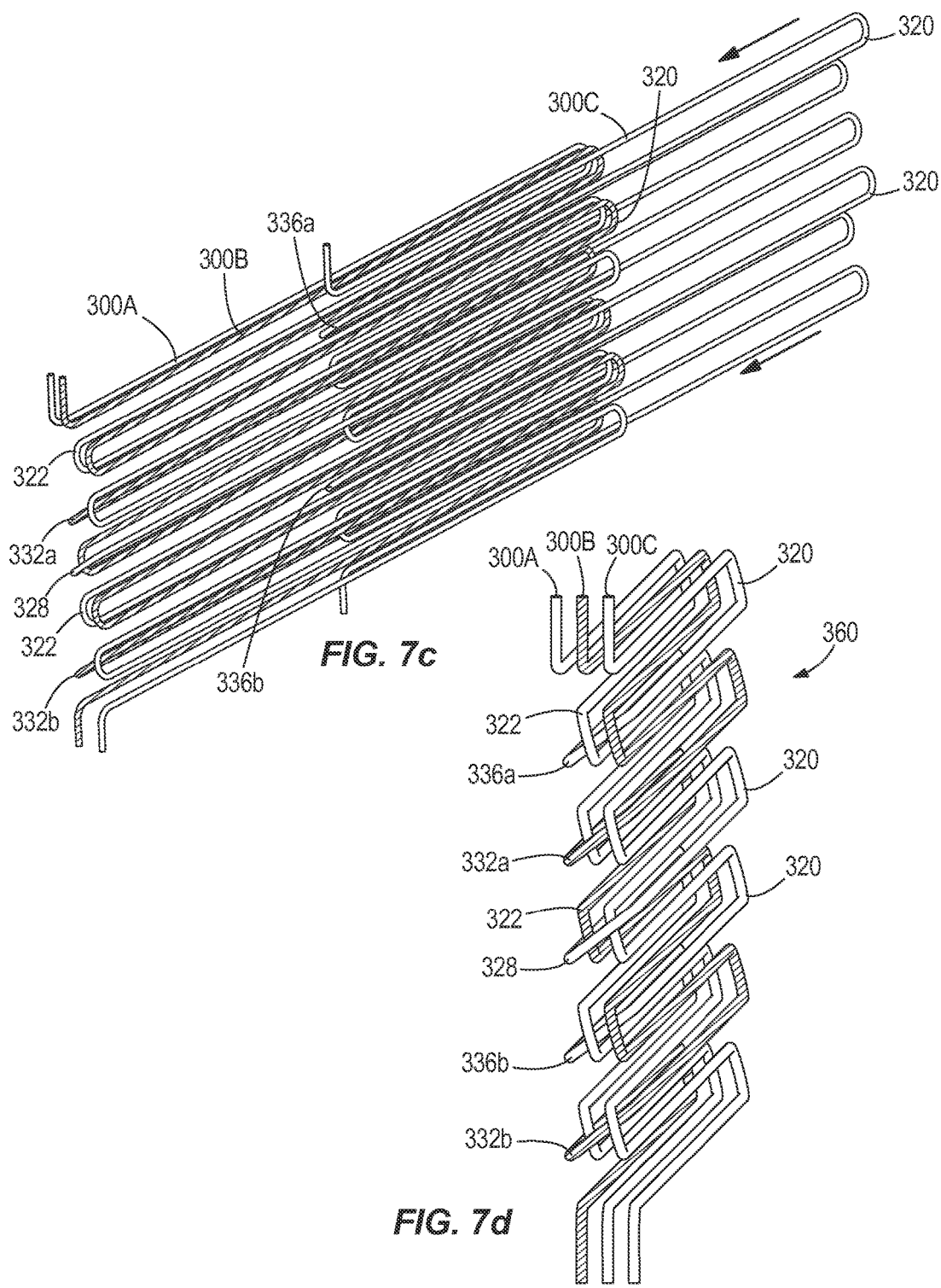

Referring to FIG. 7c, the tube circuit 300C is partially engaged or nested with the previously meshed tube circuits 300A, 300B without impedance from the tube circuits 300A, 300B. The tube circuit 300C includes bend portions 320, 322 and two double crossover bends 336a, 336b. As shown in FIG. 7d, the tube circuits 300A, 300B, 300C cooperate to form a first interzone tube network 360.

Figure 7E:
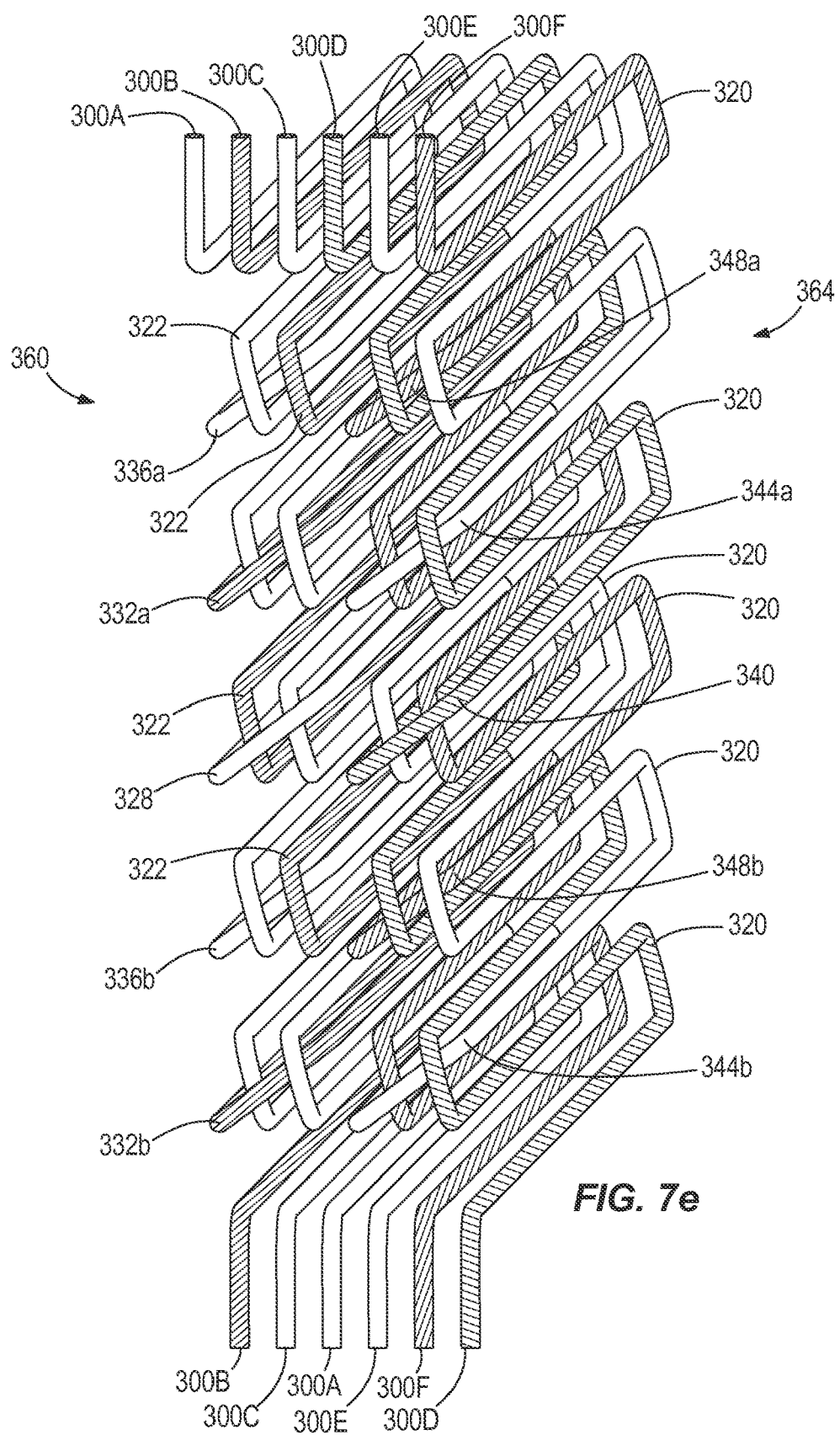
FIG. 7*e* is a perspective view of two sets of three continuous tube circuits in a nested relationship.

Referring to FIG. 7e, the tube circuits 300D, 300E, 300F are similarly positioned to form a second interzone tube network 364 adjacent the tube network 360. The tube circuit 300D includes bend portions 320, 322 and one double crossover bend portions 340. The tube circuit 300E includes bend portions 320, 322 and two double crossover bend portions 344a, 344b. The tube circuit 300F includes bend portions 320, 322 and two double crossover bend portions 348a, 348b. The tube circuit 300E meshes with the tube circuit 300D and the tube circuit 300F meshes with the meshed tube circuits 300D, 300E. As illustrated, the second interzone tube network 364 does not interfere with the first interzone tube network 360.

Referring again to FIGS. 6a and 6b, the tube circuits 300A-C crossover within zones 1-3 adjacent the first end 294 and the tube circuits 300D-F cross within zones 4-6 adjacent the first end 294. More specifically, the double crossover bend portions 328, 332, 336, 340, 344, 348 for the circuits 300A-F are located at the first end 294, and the return bend portions 320 do not cross over between zones at the second end 310. Also, none of the tube passes 358 cross over from one zone to another through the heat exchanger 290.

Figure 8:
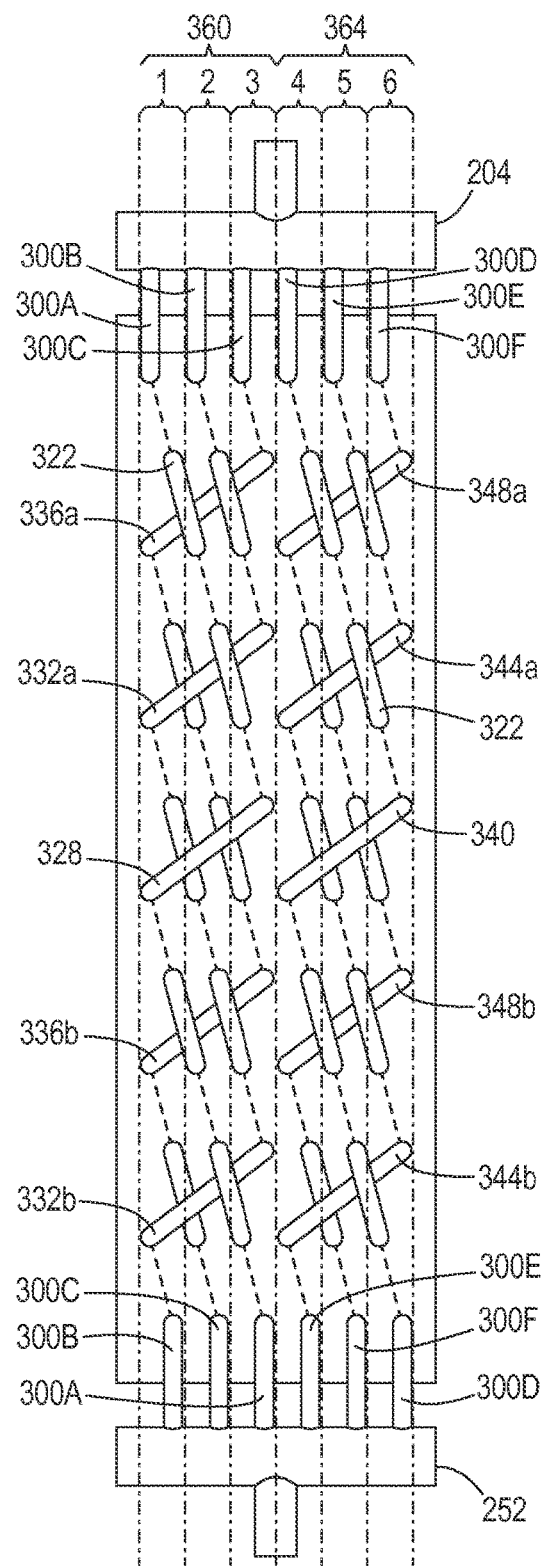
FIG. 8 is an end view of the heat exchanger of FIG. 6*a*.

Referring to FIG. 8, the first tube network 360 directs refrigerant within the zones 1-3, with each tube circuit 300A, 300B, 300C passing through each of the zones 1, 2, 3. From the inlet manifold 204, refrigerant enters the tube circuit 300A within zone 1, transitions to zone 3 through two consecutive return bend portions 322, and crosses back to zone 1 by virtue of the double crossover bend portion 328. From zone 1, the tube circuit 300A passes through two more return bend portions 322 before reaching the manifold 252 within zone 3.

The tube circuit 300B proceeds from the manifold 204 within zone 2, transitions through the return bend portion 322 to zone 3, and then crosses back over to zone 1 with the double crossover bend 332a. After passing through two consecutive double bend portions 322 to zone 3, the double crossover bend portion 332b carries refrigerant back to zone 1 from where the refrigerant exits the heat exchanger 290 via the outlet manifold 252. The tube circuit 300C originates within zone 3, immediately crosses over to zone 1 through the double crossover bend portion 336a, passes through two consecutive return bend portions 322 to zone 3, transitions back over to zone 1 with the double crossover bend portion 336b, and transitions to zone 2 through a return bend portion 322 before reaching the outlet manifold 252.

With continuing reference to FIG. 8, the second tube network 364 directs refrigerant through the zones 4-6, with each tube circuit 300D, 300E, 300F passing through each of the zones 4, 5, 6. The tube circuits 300D-F are patterned in the same manner as the tube circuits 300A-C, with double crossover bend portions 340, 344, 346 in lieu of the double crossover bend portions 328, 332, 336 of the tube circuits 300A-C. in all other aspects, the routing of the tube circuits 300D-F is the same as the tube circuits 300A-C. As shown, the tube circuits 300A and 300D each include one double crossover bend portion and the tube circuits 300B, 300C, 300E, and 300F each include two double crossover bend portions.

Figure 9:
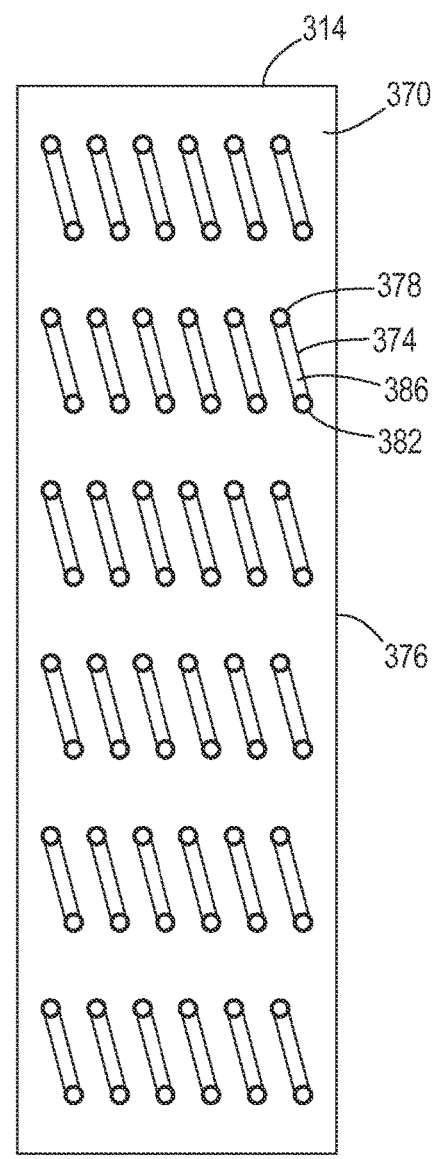
FIG. 9 is a section view of the heat exchanger of FIG. 6*a* taken along line 9-9.

FIG. 9 shows the orientation of the tube circuits 300A-F adjacent the interior fin 314. The interior fin 314 is formed from a plate 370 that has a plurality of "dog bone" slots 374. Each dog bone slot 374 is angled with respect to a lateral edge 376 of the plate 370, and includes a first tube orifice 378 and a second tube orifice 382 that are connected by an elongated aperture 386. As shown, no tubes cross over within the interior of the heat exchanger 190.

With reference to FIGS. 3a-f, the heat exchanger 190 is assembled by meshing the tube circuits 200A-C together to form the first tube network 260, and meshing the tube circuits 200D-F together to form the second tube network 264. The tube networks 260, 264 are advanced through the end fin 218 at the near end 194 of the heat exchanger 190 and subsequently progress through the interior fins 214 before passing through the end fin 216 at the second end 210. Each bend portion 220 passes directly through one of the dog bone slots 274 of each fin 214, 216, 218 without interference. In some constructions, the tube network 260 can be inserted from one end of the heat exchanger 190 and the tube network 264 can be inserted from the opposite end of the heat exchanger 190. In other constructions, the tube circuits 200A-F are not initially formed as separate tube networks 260, 264. In these constructions, each tube circuit 200A-F is advanced individually through the fins 214, 216, 218 in a predetermined order. It should be understood that the heat exchanger 290 can be assembled in the same manner.

Figure 10:
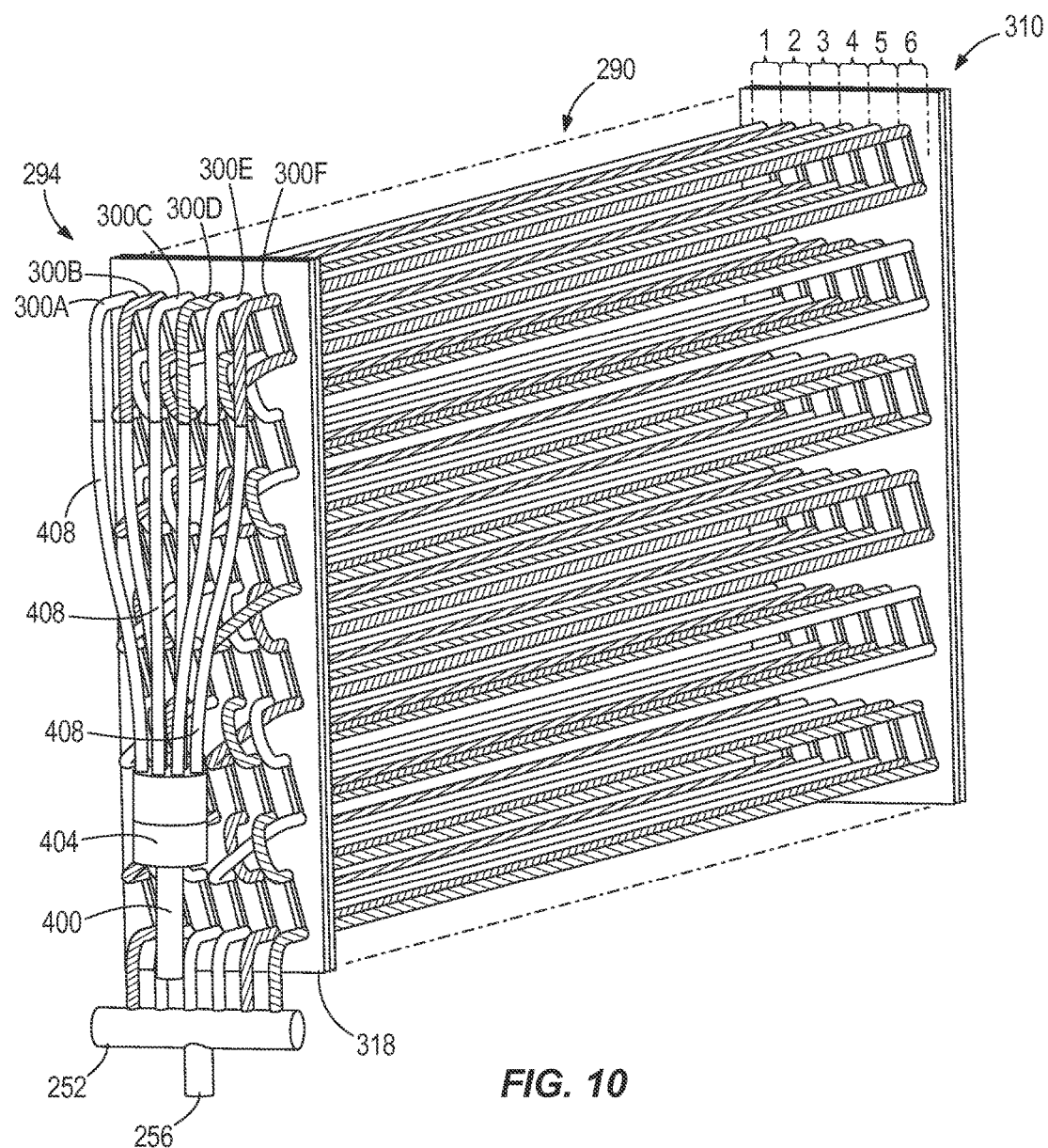
FIG. 10 is another perspective view of the heat exchanger of FIG. 6*a* with an alternative inlet arrangement.
Figure 11:
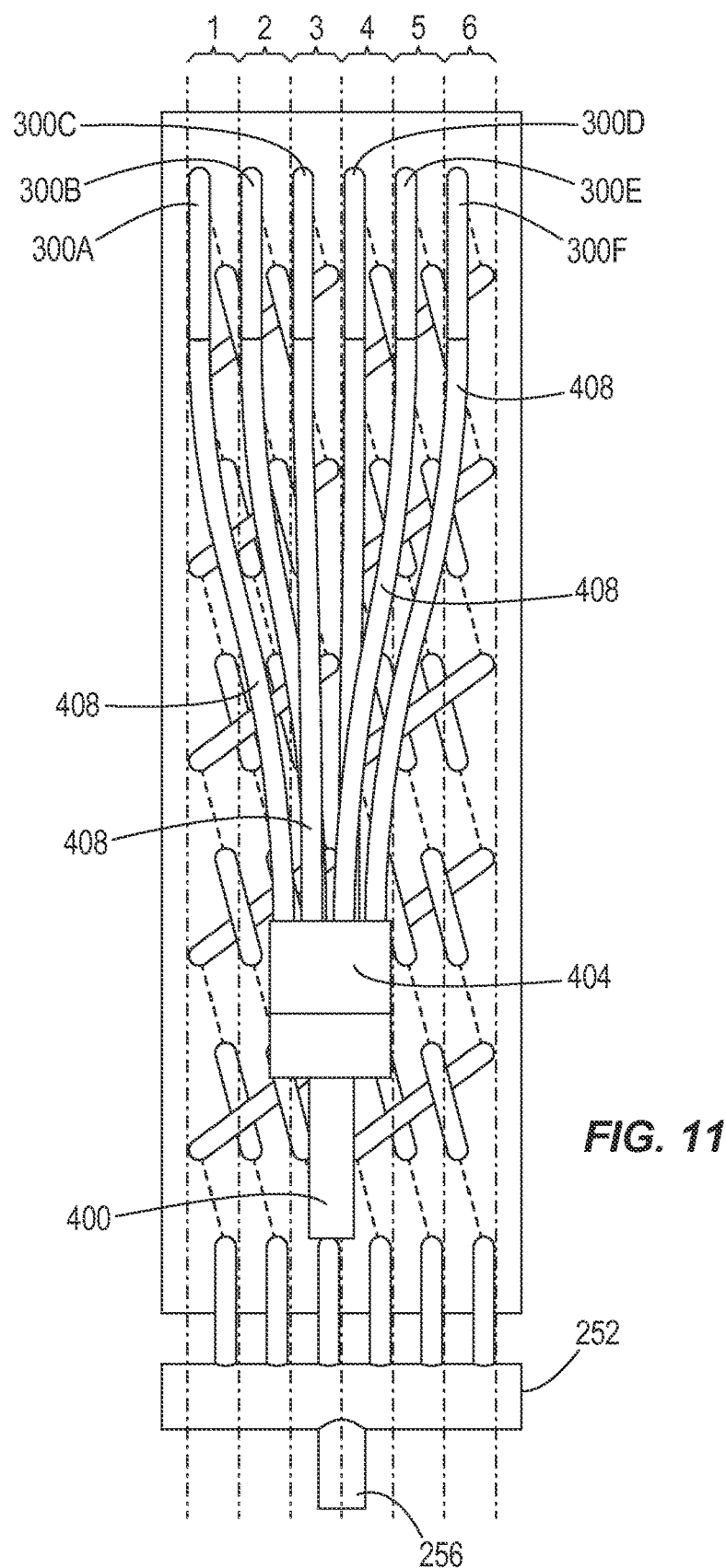
FIG. 11 is an end view of the heat exchanger of FIG. 10.

After the tube networks 260, 264 (360, 364) are assembled with the fins 214, 216, 218 (314, 316, 318), the manifolds 204, 252 are fixed or attached to the tube ends. FIGS. 10 and 11 show an alternative inlet manifold arrangement with an inlet port 400 that directs refrigerant to a two-phase flow distributor 404, which mixes the refrigerant gas and liquid homogenously for equal distribution to the circuits. Aluminum alloy or copper tubes 408 connect the distributor 404 to the respective tube circuits 300A-F. A two-phase flow distributor can be used in place of any of the inlet manifolds herein described.

In operation, refrigerant from the refrigerant system (not shown) is directed from the inlet port 200 (or 400) to the inlet manifold 204 (or distributor 404) and is dispersed through the tube circuits 200A-F for the tube circuits 300A-F) such that refrigerant passes between zones 1-3 and between zones 4-6. Heat is absorbed in the tube circuits 200A-F via the airflow 144, and the vaporized refrigerant is collected from each circuit 200A-F (or 300A-F) at the outlet manifold 252 and thereafter dispersed through the outlet port 256 back to the remainder of the refrigerant system. As a result, air passing through the heat exchanger 190, 290 in any given zone flows over three independent tube circuits before exiting the heat exchanger 190, 290.

Shifting individual tube circuits between zones 1-6 balances the refrigerant superheat levels within each circuit, maximizing the heat transfer rate from the air to the refrigerant and more uniformly cooling the air across the entire width of the heat exchanger 190, 290. Utilizing continuous tubes in such a heat exchanger eliminates the risk of refrigerant leakage through joints while also reducing manufacturing time and effort.

Figure 12:
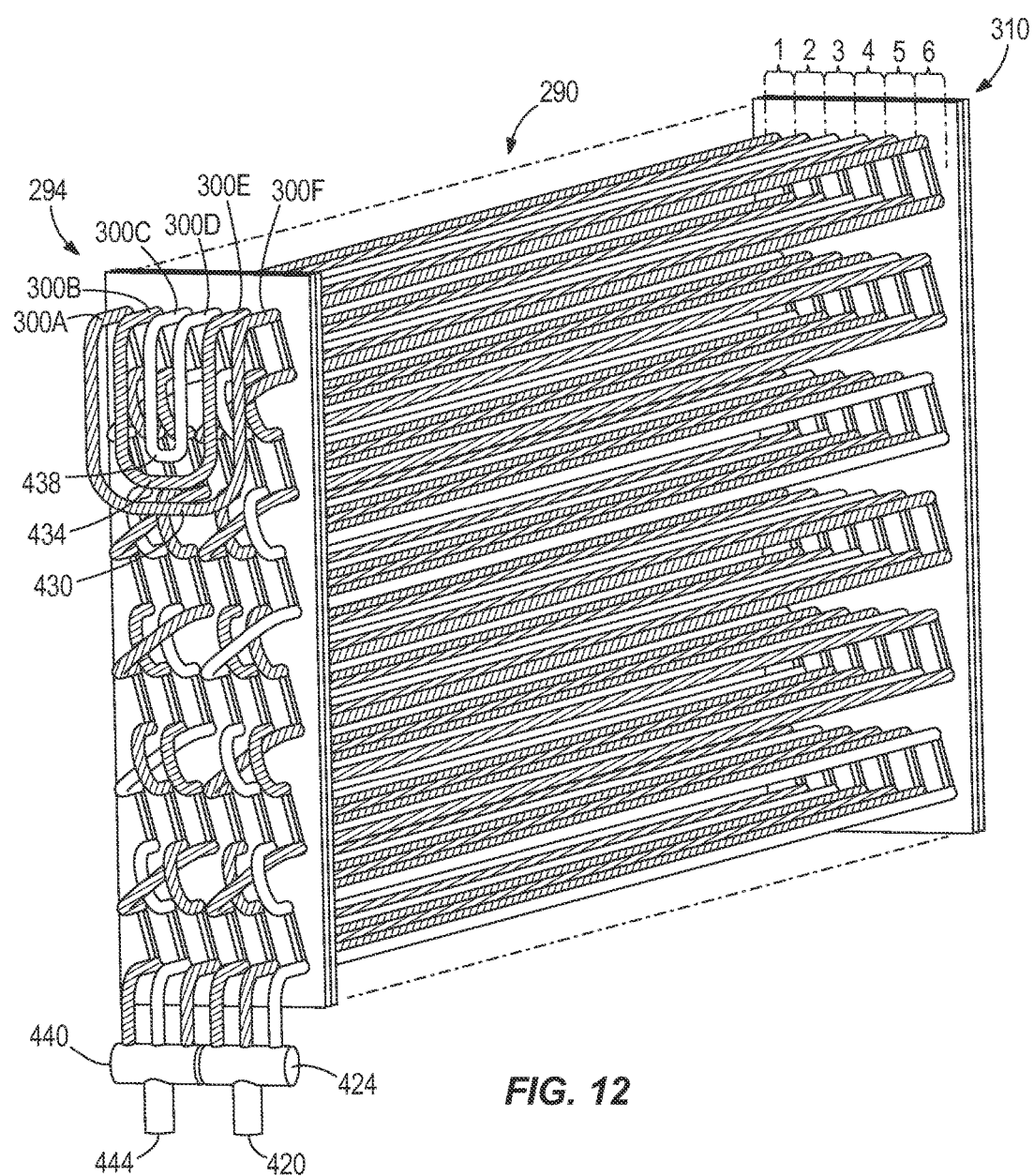
FIG. 12 is another perspective view of the heat exchanger of FIG. 6*a* with an alternative inlet arrangement.
Figure 13:
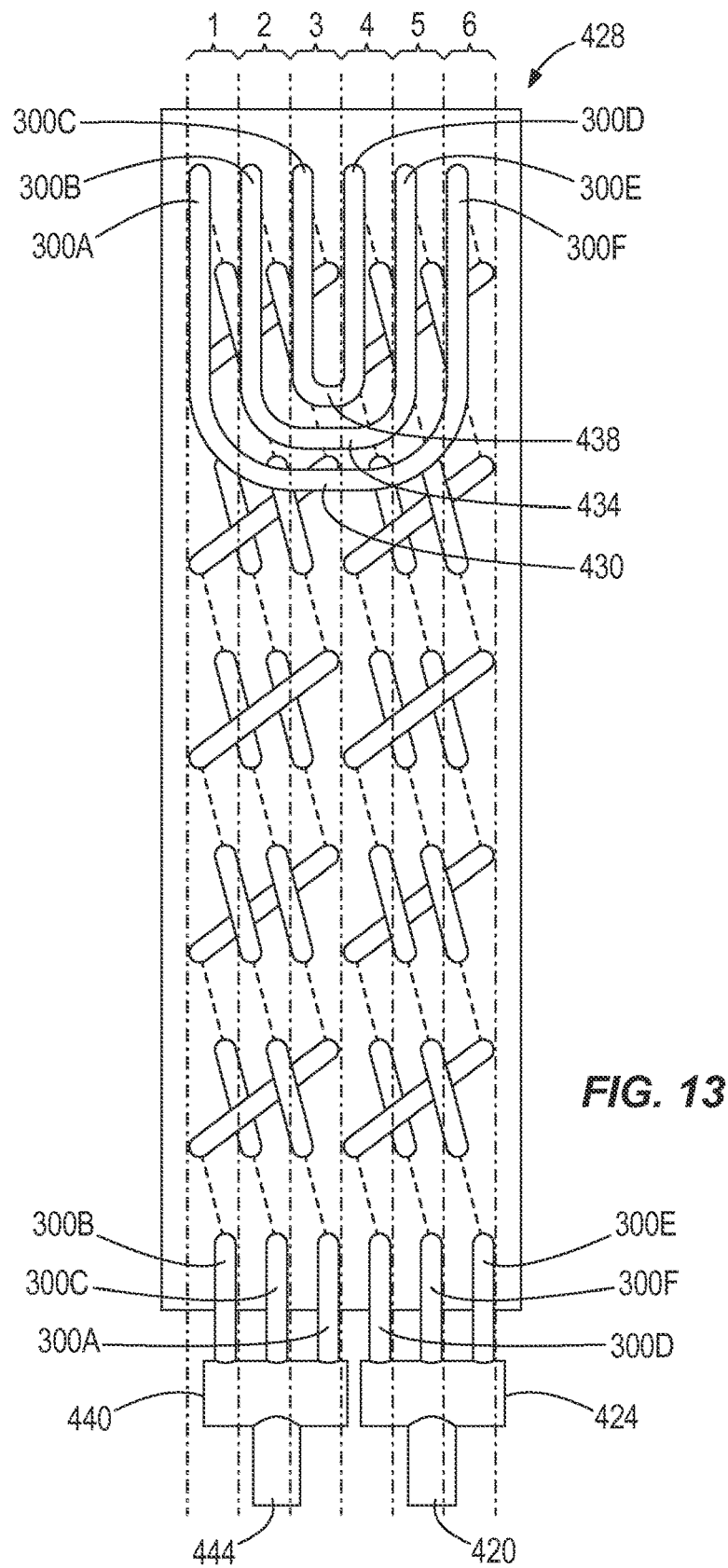
FIG. 13 is an end view of the heat exchanger of FIG. 12.

Referring to FIGS. 12-13, in another construction, the six tube circuits are not individually maintained from the refrigerant inlet to the refrigerant outlet, but instead combine to form three circuits spanning across all six zones, eliminating the separation between tube networks 360, 364. For simplicity, the specific application herein discussed is shown with respect to heat exchanger 290, but is equally applicable to heat exchanger 190. An inlet port 420 at the first end 294 of the heat exchanger 290 directs refrigerant to an inlet manifold or distributor 424, which distributes the refrigerant to three of the six circuits, 300D, 300E, and 300F. At the top 428 of the heat exchanger, circuit 300F combines with circuit 300A through bend connection 430. Circuit 300E combines with circuit 300B through bend connection 434. Circuit 300D combines with circuit 300C through bend connection 438. An outlet manifold 440 collects refrigerant that has flowed the length of the combined tube circuits (now in circuits 300A-C) and directs it to an outlet port 444 for recirculation through the refrigerant system (not shown).

In operation of the tube circuits illustrated in FIGS. 12 and 13, refrigerant from the refrigerant system is directed from the inlet port 420 to the inlet manifold 424 and is dispersed through the tube circuits 300D-E such that refrigerant passes between zones 4-6 as it flows to the top 428 of the heat exchanger 290 and absorbs heat from the airflow 144. Refrigerant from circuit 300F flows through connection 430 to circuit 300A while refrigerant from circuit 300E flows through connection 434 to circuit 300B and refrigerant from circuit 300D flows through connection 438 to circuit 300C. The refrigerant passes between zones 1-3 as it flows from the top 428 toward the outlet manifold 440 and is collected therein and discharged through the outlet port 444. Passing refrigerant across the entire width of the heat exchanger maximizes balancing of the refrigerant superheat.

Figure 14:
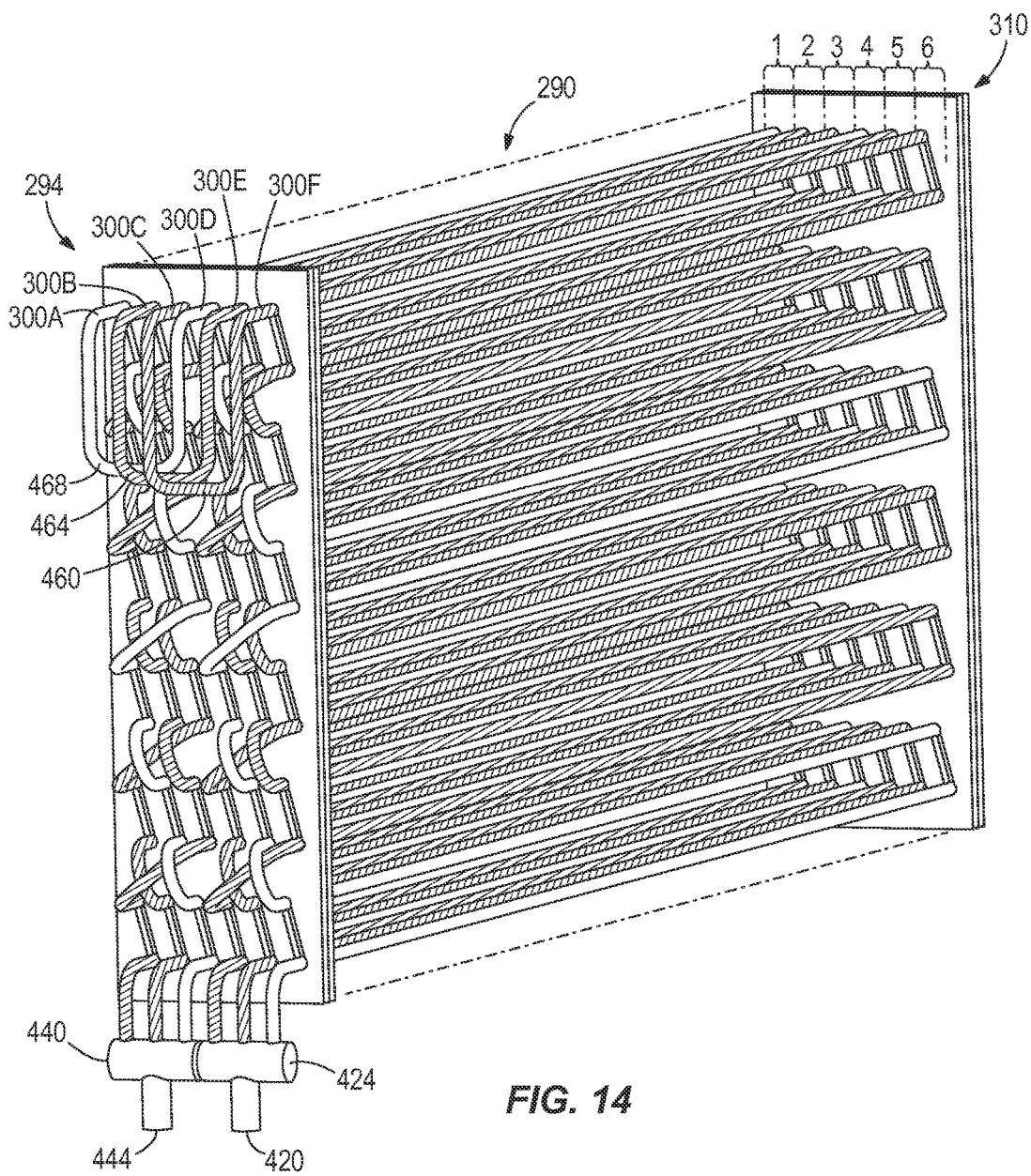
FIG. 14 is another perspective view of the heat exchanger of FIG. 6*a* with an alternative inlet arrangement.
Figure 15:
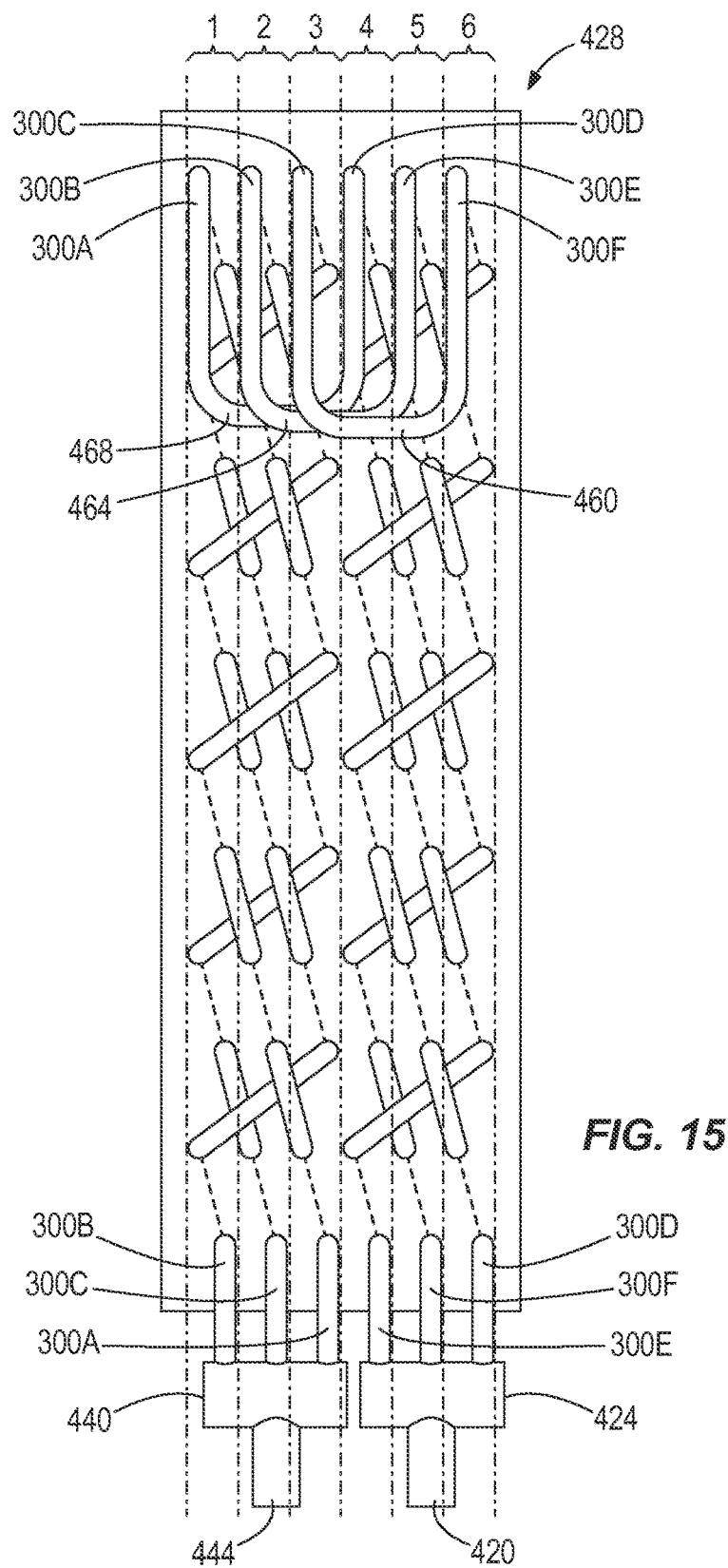
FIG. 15 is an end view of the heat exchanger of FIG. 14.

Referring to FIGS. 14-15, the six tube circuits also combine to form three circuits spanning across all six zones, but the combinations are different than those shown in FIGS. 12-13. The inlet port 420 directs refrigerant to the inlet manifold 424, which distributes the refrigerant to circuits 300D), 300E, and 300F. At the top 428 of the heat exchanger, circuit 300F combines with circuit 300C through bend connection 460. Circuit 300E combines with circuit 300B through bend connection 464. Circuit 300D combines with circuit 300A through bend connection 468. The outlet manifold 440 again collects refrigerant for discharge through outlet port 444.

In operation of the tube circuits illustrated in FIGS. 14 and 15, refrigerant from the refrigerant system is directed from the inlet port 420 to the inlet manifold 424 and is dispersed through the tube circuits 300D-E such that refrigerant passes between zones 4-6 as it flows to the top 428 of the heat exchanger 290 and absorbs heat from the airflow 144. Refrigerant from circuit 300F flows through connection 460 to circuit 300C while refrigerant from circuit 300E flows through connection 464 to circuit 300B and refrigerant from circuit 300D flows through connection 468 to circuit 300A. The refrigerant passes between zones 1-3 as it flows from the top 428 toward the outlet manifold 440 and is collected therein and discharged through the outlet port 444.

Such a system as shown in any of the previously described embodiments can have more or fewer than the number of circuits illustrated (i.e., the six circuits of FIGS. 1-11 and the three total circuits of FIGS. 12-15) and can have more or fewer than twelve passes 258, 358. In addition, the inlet and outlet ports 420, 444 and manifolds 424, 440 can alternatively be positioned at the top 428 of the heat exchanger 190, 290, and in some embodiments, the inlet ports and manifold can be positioned at one end of the heat exchanger 190, 290 and the outlet ports and manifold can be positioned at the other end of the heat exchanger 190, 290.

Various features and advantages of the invention are set forth in the following claims.

The invention claimed is:

1. A multi-zone heat exchanger having a first end and a second end and a width divided into a plurality of parallel airflow zones, each zone extending from the first end to the second end and defining an airflow section of the heat exchanger that receives a portion of the airflow through the heat exchanger, the heat exchanger comprising:
a refrigerant inlet port;
a refrigerant outlet port;
a first tube of continuous construction defining a first tube circuit including first return bend portions and coupled to the inlet port and to the outlet port, the first tube circuit spanning three or more passes from the first end to the second end, the first tube circuit passing between a first zone, a second zone, and a third zone of the plurality of zones; and
a second tube of continuous construction defining a second tube circuit including second return bend portions and coupled to the inlet port and to the outlet port, the second tube circuit spanning three or more passes from the first end to the second end, the second tube circuit passing between the first zone, the second zone, and the third zone, the first tube and the second tube configured to be meshed together without interference such that movement of the second tube circuit into engagement with the first tube circuit is not impeded by the first tube circuit;
wherein the second zone is located between the first zone and the third zone,
wherein a portion of the first tube circuit passes from the first zone directly to the third zone over the second zone in a direction of refrigerant flow through the first tube circuit, and
wherein the second tube circuit passes from the first zone directly to the third zone over the second zone in a direction of refrigerant flow through the second tube circuit.

2. The heat exchanger of claim 1, wherein one of the first return bend portions joins two of the first tube passes at the second end and one of second return bend portions joins two of the second tube passes at the second end.

3. The heat exchanger of claim 2, wherein the first return bend joining the two of the first tube passes is positioned entirely within a single zone of the plurality of zones, and wherein the second return bend joining the two of the second tube passes is positioned entirely within a single zone of the plurality of zones.

4. The heat exchanger of claim 1, wherein one of the first return bend portions joins two of the first tube passes at the first end and one of the second return bend portions joins two of the second tube passes at the first end.

5. The heat exchanger of claim 1, further including a first fin positioned at the first end and a second fin positioned at the second end, and wherein each pass of the first tube is disposed in only one of the plurality of zones between the first end and the second end.

6. The heat exchanger of claim 1, wherein the first tube circuit also passes from the third zone directly to the second zone and from the second zone directly to the first zone.

7. The heat exchanger of claim 6, wherein the plurality of parallel zones includes a fourth zone, a fifth zone, and a sixth zone, and wherein the first tube circuit passes from the fourth zone to the fifth zone and from the fifth zone to the sixth zone.

8. The heat exchanger of claim 7, wherein the first tube circuit passes from one of the first zone, the second zone, and the third zone to one of the fourth zone, the fifth zone, and the sixth zone.

9. The heat exchanger of claim 6, wherein the second tube circuit passes from the first zone to the second zone and from the second zone to the third zone.

10. The heat exchanger of claim 4, wherein the first return bend joining the two of the first tube passes and the first return bend joining the two of the second tube passes each crosses from the first zone to the second zone.

11. The heat exchanger of claim 10, wherein another of the first return bend portions joins two of the first tube passes at the first end, and wherein the another first return bend crosses from the third zone to the first zone.

12. The heat exchanger of claim 11, wherein another of the second return bend portions joins two of the second tube passes at the first end, and wherein the another second return bend crosses from the third zone to the first zone.

13. The heat exchanger of claim 1, further including a third tube of continuous construction defining a third tube circuit including one or more third return bend portions and coupled to the inlet port and to the outlet port, the third tube circuit spanning at least three or more passes from the first end to the second end, the third tube circuit passing between the first zone, the second zone, and the third zone.

14. The heat exchanger of claim 13, wherein the third tube is configured to be meshed with the second tube and with the first tube without interference such that movement of the third tube circuit into engagement with the first tube circuit and the second tube circuit is not impeded by the first tube circuit or by the second tube circuit.

15. The heat exchanger of claim 1, wherein at least four passes of the first tube circuit extend through the same zone, and wherein at least four passes of the second tube circuit extend through the same zone.

16. A method of assembling a multi-zone heat exchanger having a first end and a second end and a width divided into a plurality of parallel airflow zones, each zone extending from the first end to the second end and defining an airflow section of the heat exchanger that receives a portion of the airflow through the heat exchanger, the method comprising:
positioning in a first direction a first tube of continuous construction defining a first tube circuit including first return bend portions and coupled to an inlet port and to an outlet port, the first tube circuit passing between a first zone, a second zone, and a third zone of the plurality of zones, the first tube spanning three or more passes from the first end to the second end and one of the first return bend portions joining two of the passes at the first end and crossing from the first zone directly to the third zone over the second zone in a direction of refrigerant flow through the first tube circuit with the second zone located between the first zone and the third zone, into a meshed relationship with a second tube of continuous construction defining a second tube circuit including second return bend portions and coupled to the inlet port and to the outlet port, the second tube circuit passing between the first zone, the second zone, and the third zone, the second tube spanning three or more passes from the first end to the second end and one of the second return bend portions joining two of the second tube passes at the first end and crossing from the first zone directly to the third zone over the second zone in a direction of refrigerant flow through the second tube circuit, the meshed relationship forming a tube network without interference such that movement of the second tube circuit into engagement with the first tube circuit is not impeded by the first tube circuit; and
moving the tube network in a second direction opposite the first direction through a plurality of parallel fins into a heat exchange relationship with the fins.

17. The method of claim 16, wherein another of the first return bend portions of the first tube joins two of the passes at the second end and another of the second return bend portions of the second tube joins two of the passes at the second end, wherein each fin of the plurality of fins includes a plurality of slots, and further wherein moving the tube network in the second direction includes passing the another first return bend and the another second return bend through the plurality of slots.

18. The method of claim 16, further including positioning a third tube spanning at least four or more passes and defining a third tube circuit including one or more third return bend portions joining two of the passes at the first end and crossing from the first zone to the third zone and another return bend portions joining two of the passes at the first end and crossing from the third zone to the second zone, in a meshed relationship with the first tube and with the second tube, and wherein the positioning includes moving the third tube relative to the first and second tubes in the first direction to form the tube network without interference such that movement of the third tube circuit into engagement with the first tube circuit and the second tube circuit is not impeded by the first tube circuit or by the second tube circuit.

19. A multi-zone heat exchanger having a first end and a second end and a width divided into a plurality of parallel airflow zones, each zone extending from the first end to the second end and defining an airflow section of the heat exchanger that receives a portion of the airflow through the heat exchanger, the heat exchanger comprising:
a refrigerant inlet port;
a refrigerant outlet port;
a plurality of fins spaced between the first end and the second end;
a first tube of continuous construction defining a first tube circuit including one or more first return bend portions and coupled to the inlet port and to the outlet port, the first tube circuit spanning at least four passes extending through the plurality of fins, all of the at least four passes of the first tube circuit disposed in the same zone, the first tube circuit passing between three zones of the plurality of zones;

a second tube of continuous construction defining a second tube circuit including one or more second return bend portions and coupled to the inlet port and to the outlet port and port, the second tube circuit spanning at least four passes extending through the plurality of fins, all of the at least four passes of the second tube circuit disposed in the same zone, the second tube circuit passing between the three zones of the plurality of zones; and a third tube of continuous construction defining a third tube circuit including one or more third return bend portions and coupled to the inlet port and to the outlet port, the third tube circuit spanning at least one pass extending through at least one of the three zones of the plurality of zones;

wherein at least the first tube is configured to be meshed with the second tube without interference such that movement of the second tube circuit into engagement with the first tube circuit is not impeded by the first tube circuit.

\* \* \* \* \*